United States Patent
Zhang et al.

(10) Patent No.: US 12,218,557 B2
(45) Date of Patent: Feb. 4, 2025

(54) VIBRATION MOTOR AND TERMINAL DEVICE

(71) Applicant: HONOR DEVICE CO., LTD., Shenzhen (CN)

(72) Inventors: Yihe Zhang, Shenzhen (CN); Bangshi Yin, Shenzhen (CN); Bin Yan, Shenzhen (CN); Jiuliang Gao, Shenzhen (CN); Jianwei Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/017,740

(22) PCT Filed: Sep. 1, 2022

(86) PCT No.: PCT/CN2022/116606
§ 371 (c)(1),
(2) Date: Jan. 24, 2023

(87) PCT Pub. No.: WO2023/103484
PCT Pub. Date: Jun. 15, 2023

(65) Prior Publication Data
US 2024/0195278 A1    Jun. 13, 2024

(30) Foreign Application Priority Data

Dec. 6, 2021 (CN) .......................... 202111480926.1
Dec. 8, 2021 (CN) .......................... 202111493655.3
(Continued)

(51) Int. Cl.
H02K 5/00      (2006.01)
H02K 5/22      (2006.01)
(Continued)

(52) U.S. Cl.
CPC .............. *H02K 33/18* (2013.01); *H02K 5/225* (2013.01); *H02K 5/24* (2013.01)

(58) Field of Classification Search
CPC ........... H02K 33/18; H02K 5/225; H02K 5/24
(Continued)

(56) References Cited

U.S. PATENT DOCUMENTS 8,395,286 B2 *  3/2013  Xu .......................... H02K 33/18
                                                          310/15
8,853,976 B2 * 10/2014  Shin ....................... F16F 15/03
                                                          318/135
(Continued)

FOREIGN PATENT DOCUMENTS

CN        201789400 U     4/2011
CN        103248755 A     8/2013
(Continued)

*Primary Examiner* — Zhengfu J Feng
(74) *Attorney, Agent, or Firm* — WOMBLE BOND DICKINSON (US) LLP

(57) ABSTRACT

A vibration motor is used for a terminal device. The terminal device is provided with a middle frame having a first avoiding hole. The vibration motor includes a housing. The housing is provided with an accommodating space inside. The housing includes a first wall plate. The first wall plate is provided with a first protruding portion that protrudes outwards. The first protruding portion is hollow inside so that a first accommodating compartment is formed. The first accommodating compartment communicates with the accommodating space. When the vibration motor is mounted on the middle frame, an outer surface of the first wall plate faces the middle frame and the first protruding portion is accommodated in the first avoiding hole.

20 Claims, 27 Drawing Sheets

(30) Foreign Application Priority Data

Dec. 22, 2021 (CN) .......................... 202111583568.7
Jan. 29, 2022 (CN) .......................... 202210112129.6

(51) Int. Cl.
*H02K 5/24* (2006.01)
*H02K 33/18* (2006.01)

(58) Field of Classification Search
USPC .......................................................... 361/600
See application file for complete search history.

(56) References Cited

U.S. PATENT DOCUMENTS

| | | | |
|---|---|---|---|
| 9,948,170 B2* | 4/2018 | Jun | .......................... H02K 33/00 |
| 2013/0200732 A1* | 8/2013 | Jun | .......................... H02K 33/16 |
| | | | 310/25 |
| 2016/0119718 A1* | 4/2016 | Yang | .......................... H04R 1/24 |
| | | | 381/351 |
| 2024/0048913 A1* | 2/2024 | Cai | ....................... H04R 1/2834 |

FOREIGN PATENT DOCUMENTS

| | | |
|---|---|---|
| CN | 105720776 A | 6/2016 |
| CN | 106954147 A | 7/2017 |
| CN | 206866813 U | 1/2018 |
| CN | 108233663 A | 6/2018 |
| CN | 108600457 A | 9/2018 |
| CN | 208062939 U | 11/2018 |
| CN | 109302036 A | 2/2019 |
| CN | 209980124 U | 1/2020 |
| CN | 210225468 U | 3/2020 |
| CN | 111010013 A | 4/2020 |
| CN | 211352255 U | 8/2020 |
| CN | 211530980 U | 9/2020 |
| CN | 212381094 U | 1/2021 |
| CN | 214228464 U | 9/2021 |
| CN | 214901294 U | 11/2021 |
| JP | H10319146 A | 12/1998 |
| KR | 20120024316 A | 3/2012 |
| WO | 2020097784 A1 | 5/2020 |
| WO | 2020228050 A1 | 11/2020 |

* cited by examiner

VIBRATION MOTOR AND TERMINAL DEVICE

CROSS-REFERENCE TO RELATED APPLICATIONS

This application is a national stage of International Application No. PCT/CN2022/116606, filed on Sep. 1, 2022, which claims priority to Chinese Patent Application No. 202111480926.1, filed on Dec. 6, 2021, and Chinese Patent Application No. 202111493655.3, filed on Dec. 8, 2021, and Chinese Patent Application No. 202111583568.7, filed on Dec. 22, 2021, and Chinese Patent Application No. 202210112129.6, filed on Jan. 29, 2022. The disclosures of each of the aforementioned applications are hereby incorporated by reference in their entireties.

TECHNICAL FIELD

This application relates to the field of terminal device technologies, and in particular, to a vibration motor and a terminal device.

BACKGROUND

In a terminal device such as a mobile phone, a tablet, or a wearable device, a vibration motor is usually used for generating vibration, so as to provide a vibration feedback function in user interaction such as message notification. With progress in science and technology, terminal devices are gradually developing toward a tendency of thinness, and the device thickness urgently needs to be reduced. Consequently, accommodating space of a vibration motor in a terminal device is correspondingly reduced. However, due to the condition limitation of a vibration motor, a thinner body causes a problem of vibration performance degradation. Therefore, the thickness of a current vibration motor becomes one of bottlenecks impeding further reduction of the terminal device thickness. Thus, it can be learned that how to resolve the contradiction between motor performance and the motor thickness becomes a current design problem.

SUMMARY

Embodiments of this application provide a vibration motor and a terminal device to resolve the contradiction between terminal device thickness and vibration motor performance.

To achieve the foregoing objective, the following technical solutions are used in the embodiments of this application.

According to a first aspect, this application provides a vibration motor, used for a terminal device. The terminal device is provided with a middle frame inside. The middle frame is provided with a first avoiding hole. The vibration motor includes a housing. An accommodating space is formed in the housing. The housing includes a first wall plate. The first wall plate is provided with a first protruding portion that protrudes outwards. The first protruding portion is hollow inside so that a first accommodating compartment is formed. The first accommodating compartment communicates with the accommodating space. When the vibration motor is mounted on the middle frame, an outer surface of the first wall plate faces the middle frame and the first protruding portion is accommodated in the first avoiding hole.

According to the vibration motor provided in this embodiment of this application, the first wall plate is provided with the first protruding portion that is hollow inside, so that some components such as a coil and a mass block of the vibration motor are accommodated in the first accommodating compartment in the first protruding portion; in addition, the middle frame is provided with the first avoiding hole corresponding to the first protruding portion, so that the first protruding portion is accommodated in the avoiding hole. In this way, a height by which the vibration motor protrudes from the middle frame can be reduced, thereby reducing a mounting height of the vibration motor. Therefore, volumes of structures such as the mass block, the coil, a magnet assembly, and a damping structure inside the vibration motor can be increased without increasing overall space occupied by the vibration motor, so that overall performance of the vibration motor can be improved without increasing a thickness of the terminal device. Moreover, while the volumes of the structures inside the vibration motor are kept unchanged, that is, while original performance of the vibration motor is maintained, the mounting height of the vibration motor can be reduced, so that the space occupied by the vibration motor can be reduced, thereby thinning the terminal device.

In a possible design manner of the first aspect, the first wall plate is provided with a through communication opening, the first protruding portion is disposed at the communication opening, and the first accommodating compartment in the first protruding portion communicates with the accommodating space in the housing through the communication opening.

In a possible design manner of the first aspect, the first protruding portion includes a first top wall and a first encircling wall. The first encircling wall is in the shape of a ring. The first encircling wall encircles an outer edge of the first top wall. The first accommodating compartment is limited between the first top wall and the first encircling wall. An end of the first encircling wall farther away from the first top wall is fixedly connected to the first wall plate. A structure is simple, and processing is convenient.

In a possible design manner of the first aspect, an inner surface of the first encircling wall is level with an inner surface of the communication opening.

In a possible design manner of the first aspect, the first encircling wall surrounds an outer side of the communication opening.

In a possible design manner of the first aspect, an outline of an orthographic projection of the first protruding portion on a plane in which the first wall plate is located is located on an inner side of an outer edge of the first wall plate.

In a possible design manner of the first aspect, the first protruding portion and the first wall plate are an integral structure. This can increase connection strength between the first protruding portion and the first wall plate and simplify a processing process.

In a possible design manner of the first aspect, the first protruding portion further includes a flanging portion. One end of the flanging portion is fixedly connected to the end of the first encircling wall farther away from the first top wall, and the other end of the flanging portion extends in a direction leaving the first encircling wall. The first protruding portion is fixedly connected to the first wall plate via the flanging portion. This can increase a contact area between the first protruding portion and the first wall plate, reduce assembly difficulty, and increase connection strength.

In a possible design manner of the first aspect, the flanging portion is fixedly connected to the outer surface of the first wall plate.

In a possible design manner of the first aspect, the flanging portion is fixedly connected to an inner surface of the first wall plate.

In a possible design manner of the first aspect, part of the flanging portion is fixedly connected to an inner surface of the first wall plate, and the other part of the flanging portion is fixedly connected to the outer surface of the first wall plate.

In a possible design manner of the first aspect, the first avoiding hole is a blind hole. This can increase airtightness between the vibration motor and the middle frame.

In a possible design manner of the first aspect, the first avoiding hole is a through hole. This is conducive to increasing space in the first accommodating compartment.

In a possible design manner of the first aspect, the vibration motor includes a mass block, a driving assembly, and a damping structure. The mass block is configured to reciprocatively vibrate relative to the housing in a plane that is parallel to the plane in which the first wall plate is located. The driving assembly is configured to drive the mass block to reciprocatively vibrate relative to the housing in the plane that is parallel to the plane in which the first wall plate is located. The damping structure is configured to provide damping force for the mass block so that the mass block stops vibrating.

In a possible design manner of the first aspect, the damping structure is a damping copper plate.

In a possible design manner of the first aspect, the damping structure is a magnetic liquid, a silica gel, or a foam.

In a possible design manner of the first aspect, the driving assembly includes a magnet assembly and a coil. The magnet assembly is fixed to the mass block. The coil and the magnet assembly cooperate to drive the mass block so that the mass block reciprocatively vibrates relative to the housing in the plane that is parallel to the plane in which the first wall plate is located. At least part of the coil is located in the first accommodating compartment. In this way, as at least part of the coil is accommodated in the first accommodating compartment, space occupied by the coil can be reduced, and volumes of structures such as the mass block and the magnet assembly of the vibration motor can be increased without increasing the overall space occupied by the vibration motor, so that the overall performance of the vibration motor can be improved without increasing the thickness of the terminal device. Moreover, while the volumes of the structures inside the vibration motor are kept unchanged, that is, while the original performance of the vibration motor is maintained, the mounting height of the vibration motor can be reduced, so that the space occupied by the vibration motor can be reduced, thereby thinning the terminal device.

In a possible design manner of the first aspect, the vibration motor further includes an electrical connection structure. The electrical connection structure includes a first segment, a second segment, and a third segment that are sequentially connected. The first segment is fixed to a compartment bottom wall of the first accommodating compartment. The coil is fixed to the first segment and electrically connected to the first segment. The second segment is fixed to an inner side wall of the first accommodating compartment. Part of the third segment is located outside the housing, where the part of the third segment located outside the housing is provided with a positive terminal and a negative terminal.

In this way, as the first segment of the electrical connection structure and part of the coil are accommodated in the first accommodating compartment, space occupied by the electrical connection structure and the coil can be reduced, and the volumes of the structures such as the mass block and the magnet assembly of the vibration motor can be increased without increasing the overall space occupied by the vibration motor, so that the overall performance of the vibration motor can be improved without increasing the thickness of the terminal device. Moreover, while the volumes of the structures inside the vibration motor are kept unchanged, that is, while the original performance of the vibration motor is maintained, the mounting height of the vibration motor can be reduced, so that the space occupied by the vibration motor can be reduced, thereby thinning the terminal device.

In a possible design manner of the first aspect, the electrical connection structure is a flexible circuit board.

In a possible design manner of the first aspect, the mass block is provided with a mounting slot, and the magnet assembly is accommodated and fixed in the mounting slot. In this way, an overall height of the vibration motor can be reduced.

In a possible design manner of the first aspect, the housing includes a second wall plate. The second wall plate is disposed opposite the first wall plate. The driving assembly includes a magnet assembly and a coil. The magnet assembly is fixed to the mass block. The coil and the magnet assembly cooperate to drive the mass block to reciprocatively vibrate relative to the housing in the plane that is parallel to the plane in which the first wall plate is located. The coil is fixedly connected to the second wall plate.

In a possible design manner of the first aspect, the damping structure is located in the first accommodating compartment, and/or the mass block is provided with a second protruding portion, where the second protruding portion is accommodated in the first accommodating compartment.

In a possible design manner of the first aspect, the mass block is provided with a through mounting slot, the magnet assembly is fixed in the mounting slot, and an end of the magnet assembly farther away from the second wall plate is accommodated in the first accommodating compartment.

In a possible design manner of the first aspect, the coil and the magnet assembly are arranged in a height direction of the housing, and the coil is located on a side of the magnet assembly closer to or farther away from the first wall plate.

In a possible design manner of the first aspect, the magnet assembly includes a first magnet, a second magnet, and a magnetoconductive part. The first magnet and the second magnet are arranged at an interval in a direction parallel to the first wall plate. A magnetization direction of the first magnet and a magnetization direction of the second magnet are both perpendicular to the plane in which the first wall plate is located, and the magnetization direction of the first magnet is opposite to the magnetization direction of the second magnet. The magnetization direction is a direction from the north pole to the south pole.

In a possible design manner of the first aspect, the magnet assembly has a magnetic gap, the coil is located in the magnetic gap, and an end of the coil farther away from the second wall plate is accommodated in the first accommodating compartment. In this way, sizes of the coil and the magnet assembly in a thickness direction of the housing can be set to comparatively large values.

In a possible design manner of the first aspect, the first protruding portion includes a first top wall and a first encircling wall. The first encircling wall encircles an outer edge of the first top wall. An end of the first encircling wall farther away from the first top wall is fixedly connected to the first wall plate. An orthographic projection of the first protruding portion on the plane in which the first wall plate is located is a first projection. An outline of the first projection is located on an inner side of an outer edge of the first wall plate. A structure is simple, and processing is easy.

In a possible design manner of the first aspect, the first protruding portion includes a first top wall, a first side wall, and a second side wall. The first side wall is disposed opposite the second side wall, and the first side wall and the second side wall are both located between the first top wall and the first wall plate. Two ends of the first side wall in a length direction of the first side wall both extend to be level with an outer edge of the first wall plate. Two ends of the second side wall in a length direction of the second side wall both extend to be level with the outer edge of the first wall plate. In this way, a processing process of the first protruding portion can be simplified, and accommodating space in the first accommodating compartment can be increased.

In a possible design manner of the first aspect, the first wall plate includes a first wall plate body and an extension plate. The extension plate is disposed on an outer edge of the first wall plate body. The extension plate and the first wall plate body are coplanar. An orthographic projection of the first avoiding hole on the plane in which the first wall plate is located is a second projection. An outline of the second projection is located on the inner side of the outer edge of the first wall plate, and the outline of the second projection and the outer edge of the first wall plate are spaced apart. In this way, as the first wall plate is provided with the extension plate, a contact area between the first wall plate and a middle plate can be increased, so that a sealing part can be disposed between the first wall plate and the middle frame to improve a sealing effect between the first wall plate and the first avoiding hole.

In a possible design manner of the first aspect, the terminal device is further provided with a limiting structure inside. The limiting structure is fixed to the middle frame. A limiting space is limited between the limiting structure and the middle frame. When the vibration motor is mounted on the middle frame, the vibration motor is located in the limiting space. In this way, with the limiting structure disposed, position stability of the vibration motor can be improved, and the vibration motor is prevented from moving in a direction leaving the middle plate.

In a possible design manner of the first aspect, the terminal device is further provided with a limiting structure inside. The limiting structure is fixed to the middle frame, and the limiting structure is provided with a second avoiding hole. The housing includes a second wall plate. The second wall plate is opposite the first wall plate, and the second wall plate is provided with a third protruding portion that protrudes outwards. The third protruding portion is hollow inside so that a second accommodating compartment is formed. The second accommodating compartment communicates with the accommodating space. When the vibration motor is mounted on the middle frame, the third protruding portion is accommodated in the second avoiding hole.

Therefore, the first wall plate is provided with the first protruding portion that is hollow inside and the middle frame is provided with the first avoiding hole corresponding to the first protruding portion, so that the first protruding portion is accommodated in the first avoiding hole; in addition, the second wall plate is provided with the third protruding portion that is hollow inside and the limiting structure is provided with the second avoiding hole corresponding to the third protruding portion, so that the third protruding portion is accommodated in the second avoiding hole. In this way, not only some of the structures in the vibration motor can be disposed in the first accommodating compartment in the first protruding portion, but also some of the structures in the vibration motor can be disposed in the second accommodating compartment in the third protruding portion. Hence, the terminal device can be further thinned while vibration performance of the vibration motor is ensured. Moreover, the overall performance of the vibration motor can be further improved without increasing the thickness of the terminal device.

In a possible design manner of the first aspect, the first segment of the electrical connection structure and/or part of the coil are/is disposed in the first accommodating compartment, and the damping structure is disposed in the second accommodating compartment.

In a possible design manner of the first aspect, the first segment of the electrical connection structure and/or part of the coil are/is disposed in the first accommodating compartment, and the mass block is provided with a second protruding portion that protrudes toward the limiting structure, where the damping structure and the second protruding portion are both accommodated in the second accommodating compartment.

In a possible design manner of the first aspect, the first segment of the electrical connection structure and/or part of the coil are/is disposed in the first accommodating compartment, and the mass block is provided with a second protruding portion, where the second protruding portion is accommodated in the second accommodating compartment.

In a possible design manner of the first aspect, the first segment of the electrical connection structure and/or part of the coil are/is disposed in the first accommodating compartment, and an end of the magnet assembly farther away from the first wall plate is accommodated in the second accommodating compartment.

In a possible design manner of the first aspect, the damping structure is disposed in the first accommodating compartment, and the first segment of the electrical connection structure and/or part of the coil are/is disposed in the second accommodating compartment.

In a possible design manner of the first aspect, the mass block is provided with a second protruding portion, where the second protruding portion is accommodated in the first accommodating compartment; and the first segment of the electrical connection structure and/or part of the coil are/is disposed in the second accommodating compartment.

In a possible design manner of the first aspect, the mass block is provided with a second protruding portion, where the damping structure and the second protruding portion are accommodated in the first accommodating compartment; and the first segment of the electrical connection structure and/or part of the coil are/is disposed in the second accommodating compartment.

In a possible design manner of the first aspect, an end of the magnet assembly farther away from the second wall plate is accommodated in the first accommodating compartment, and the first segment of the electrical connection structure and/or part of the coil are/is disposed in the second accommodating compartment.

In a possible design manner of the first aspect, an end of the magnet assembly farther away from the second wall plate is accommodated in the first accommodating compartment, an end of the coil farther away from the first wall plate is accommodated in the first accommodating compartment, and the first segment of the electrical connection structure and/or part of the coil are/is disposed in the second accommodating compartment.

According to a second aspect, this application provides a vibration motor, used for a terminal device. The terminal device is provided with a middle frame and a limiting structure inside. The limiting structure is fixed to the middle frame. A limiting space is limited between the limiting structure and the middle frame. The vibration motor is located in the limiting space. The vibration motor includes a housing. The housing is provided with an accommodating space inside. The housing includes a first wall plate and a second wall plate that are opposite each other. The first wall plate faces the middle frame, and the second wall plate faces the limiting structure. The second wall plate is provided with a third protruding portion that protrudes outwards. The third protruding portion is hollow inside so that a second accommodating compartment is formed. The second accommodating compartment communicates with the accommodating space. The limiting structure is provided with a second avoiding hole. The third protruding portion is accommodated in the second avoiding hole.

This application provides the vibration motor, where the second wall plate is provided with the third protruding portion that is hollow inside and the limiting structure is provided with the second avoiding hole corresponding to the third protruding portion, so that the third protruding portion is accommodated in the second avoiding hole. In this way, some of structures in the vibration motor can be disposed in the second accommodating compartment in the third protruding portion. Hence, the terminal device can be thinned while vibration performance of the vibration motor is ensured. Moreover, overall performance of the vibration motor can be improved without increasing a thickness of the terminal device.

In a possible design manner of the second aspect, a damping structure is disposed in the second accommodating compartment.

In a possible design manner of the second aspect, a mass block is provided with a second protruding portion that protrudes toward the limiting structure, where a damping structure and the second protruding portion are both accommodated in the second accommodating compartment.

In a possible design manner of the second aspect, a mass block is provided with a second protruding portion, where the second protruding portion is accommodated in the second accommodating compartment.

In a possible design manner of the second aspect, an end of a magnet assembly farther away from the first wall plate is accommodated in the second accommodating compartment.

In a possible design manner of the second aspect, a first segment of an electrical connection structure and/or part of a coil are/is disposed in the second accommodating compartment.

In a possible design manner of the second aspect, an end of a magnet assembly farther away from the first wall plate is accommodated in the second accommodating compartment.

In a possible design manner of the second aspect, a coil is fixed to the first wall plate, and an end of the coil farther away from the first wall plate is accommodated in the second accommodating compartment.

According to a third aspect, this application provides a terminal device, including a middle frame and a vibration motor. The middle frame is provided with a first avoiding hole. The vibration motor is the vibration motor according to any one of the foregoing technical solutions.

In a possible design manner of the third aspect, the terminal device further includes a screen, and the middle frame includes a middle plate and a bezel. The bezel encircles an outer edge of the middle plate. The screen is fixed to the bezel. The vibration motor is fixed to a surface of a side of the middle plate farther away from the screen.

In a possible design manner of the third aspect, the surface of the side of the middle plate farther away from the screen is provided with a recess. At least part of the vibration motor is disposed in the recess. In this way, as at least part of the vibration motor is disposed in the recess, a height by which the vibration motor protrudes from the middle plate can be reduced, thereby thinning the terminal device and ensuring overall structural strength of the middle frame.

In a possible design manner of the third aspect, a distance between an end face of a first protruding portion farther away from a first wall plate and an outer surface of the first wall plate is a first distance, and a distance between a surface of a side of the middle plate closer to the screen and the outer surface of the first wall plate is a second distance. The first distance is less than or equal to the second distance. In this way, the first protruding portion can be prevented from extending out of the first avoiding hole, thereby avoiding interference between the first protruding portion and a component such as the screen of the terminal device.

According to a fourth aspect, this application provides a terminal device, including a middle frame, a limiting structure, and a vibration motor. The limiting structure is fixed to the middle frame. A limiting space is limited between the limiting structure and the middle frame. The vibration motor is the vibration motor according to any one of the foregoing technical solutions.

In a possible design manner of the fourth aspect, a material of the limiting structure is metal. In this way, a thickness of the limiting structure can be designed to be comparatively small on condition that structural strength is ensured. This helps reduce space occupied by the limiting structure.

In a possible design manner of the fourth aspect, the limiting structure includes a limiting portion and a connection lug. The connection lug is fixedly connected to the limiting portion. The limiting portion is opposite a second wall plate. A second avoiding hole is disposed in the limiting portion. The limiting structure is fixedly connected to the middle frame via the connection lug. A structure is simple, and processing is convenient.

In a possible design manner of the fourth aspect, the limiting portion and the connection lug are an integral structure. This can simplify a processing process of the limiting structure and reduce processing costs.

It can be understood that, for beneficial effects that can be achieved by the vibration motor according to the second aspect, the terminal device according to the third aspect, and the terminal device according to the fourth aspect that are provided above, reference may be made to the beneficial effects of the first aspect and any one of the possible design manners of the first aspect, and details are not described herein again.

BRIEF DESCRIPTION OF DRAWINGS

FIG. 20b is a stereogram of a mass block in the vibration motor shown in FIG. 20a;

FIG. 25b is an enlarged view of a region A in FIG. 25a;

FIG. 26 is an exploded view of the vibration motor shown in FIG. 25a;

FIG. 27a is an exploded view of a housing of the vibration motor shown in FIG. 25a;

Figure 1:
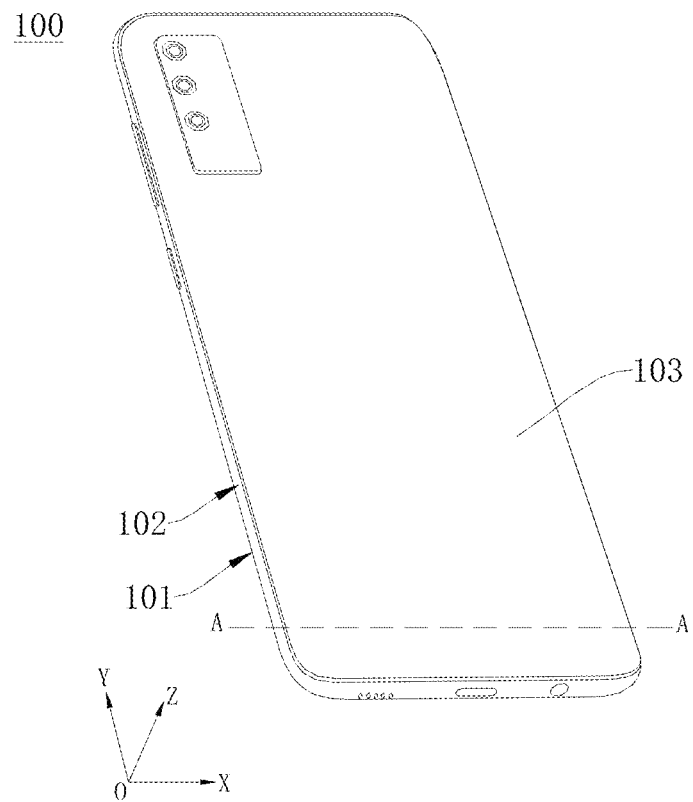
FIG. 1 is a schematic diagram of a structure of a terminal device according to some embodiments of this application.

Reference signs are listed as follows:
terminal device 100; accommodating cavity C1;
screen 101; light-transmitting cover plate 101a; display 101b;
middle frame 102; bezel 1021; middle plate 1022; first surface 1022a; second surface 1022b; recess 1022c; first avoiding hole 1023;
back cover 103; primary circuit board 104; secondary circuit board 105; connection component 106; battery 107;
vibration motor 108;
housing 1; accommodating space 1a;
first wall plate 11; first short side 111; second short side 112; first long side 113; second long side 114; first protruding portion 115; first accommodating compartment 115a; first top wall 1151; first encircling wall 1152; flanging portion 1153; first side wall 1154; second side wall 1155; communication opening 116; supporting portion 117; first wall plate body 11a; extension plate 11b;
second wall plate 12; third protruding portion 121; second top wall 1211; second encircling wall 1212; second accommodating compartment 121a;
side frame 13; first side plate 131; second side plate 132; third side plate 133; fourth side plate 134; blocking plate 135; avoiding opening 135a;
mass block 2; mounting slot 21; second protruding portion 22;
elastic assembly 3;
first elastic part 31; first fixing portion 311; second fixing portion 312; first connection portion 313;
second elastic part 32; third fixing portion 321; fourth fixing portion 322; second connection portion 323;
driving assembly 4;
magnet assembly 41; first magnet 411; second magnet 412; magnetoconductive part 413; magnetic gap K;
coil 42;
damping structure 5;
electrical connection structure 6; first segment 61; second segment 62; third segment 63; positive terminal 64; negative terminal 65;
adhesive 109;
limiting structure 110; limiting portion 110a; connection lug 110b; second avoiding hole 110c;
limiting space C2; and
buffer part 200.

DESCRIPTION OF EMBODIMENTS

In embodiments of this application, the terms "first", "second", "third", and "fourth" are merely intended for a purpose of description, and shall not be understood as an indication or implication of relative importance or an implicit indication of a quantity of indicated technical features. Therefore, a feature preceded by "first", "second", "third", or "fourth" may explicitly or implicitly include one or more features.

In the embodiments of this application, the terms "comprise" and "include" or any other variations thereof are intended to cover non-exclusive inclusions, so that a process, a method, an article, or an apparatus including a series of elements includes not only those elements but also other elements not explicitly listed or elements inherent to the process, method, article, or apparatus. In absence of more constraints, an element preceded by "includes a . . . " does not preclude the existence of another identical element in a process, a method, an article, or an apparatus that includes the element.

In the embodiments of this application, "and/or" indicates merely an association relationship for describing associated objects and represents the presence of three relationships. For example, A and/or B may represent the presence of three cases: only A, both A and B, and only B. In addition, the character "/" in this specification generally represents an "or" relationship between associated objects.

This application provides a terminal device. The terminal device is provided with a vibration motor inside, capable of vibrating to implement functions such as notification of incoming calls, messages, SMS messages, weather, or news, and haptic feedback for trigger or accidental trigger.

To overcome a technical bottleneck that the vibration motor restrains further thinning of the terminal device, in this application, a housing of the vibration motor is provided with partial protrusions (for example, a first protruding portion and a third protruding portion in the following), so that some structures (structures such as a coil, a mass block, a magnet assembly, and a damping structure) inside the vibration motor are accommodated in space in the partial protrusions; in addition, components such as a middle frame and a limiting structure inside the terminal device are provided with corresponding avoiding holes (for example, a first avoiding hole and a second avoiding hole in the following), so that the partial protrusions are accommodated in the avoiding holes, thereby reducing space occupied by the partial protrusions.

In the improvement solution of this application, because some structures such as the coil, the mass block, the magnet assembly, and the damping structure of the vibration motor can be accommodated in the partial protrusions and the partial protrusions can be accommodated in the avoiding holes in the components such as the middle frame and the limiting structure, volumes of the structures such as the mass block, the coil, and the magnet assembly inside the vibration motor can be increased without increasing overall space occupied by the vibration motor, so that overall performance of the vibration motor can be improved without increasing thickness of the terminal device. Moreover, while the volumes of the structures inside the vibration motor are kept unchanged, that is, while original performance of the vibration motor is maintained, a mounting height of the vibration motor can be reduced, so that the space occupied by the vibration motor can be reduced, thereby thinning the terminal device.

A terminal device 100 provided in this application may be but is not limited to a tablet terminal or a foldable terminal. The tablet terminal may be but is not limited to a phablet, a tablet personal computer (tablet personal computer), a tablet laptop computer (laptop computer), a tablet personal digital assistant (personal digital assistant, PDA), a tablet vehicle-mounted device, a tablet wearable device, or the like. The foldable terminal may be but is not limited to a foldable mobile phone or a foldable computer.

Figure 2:
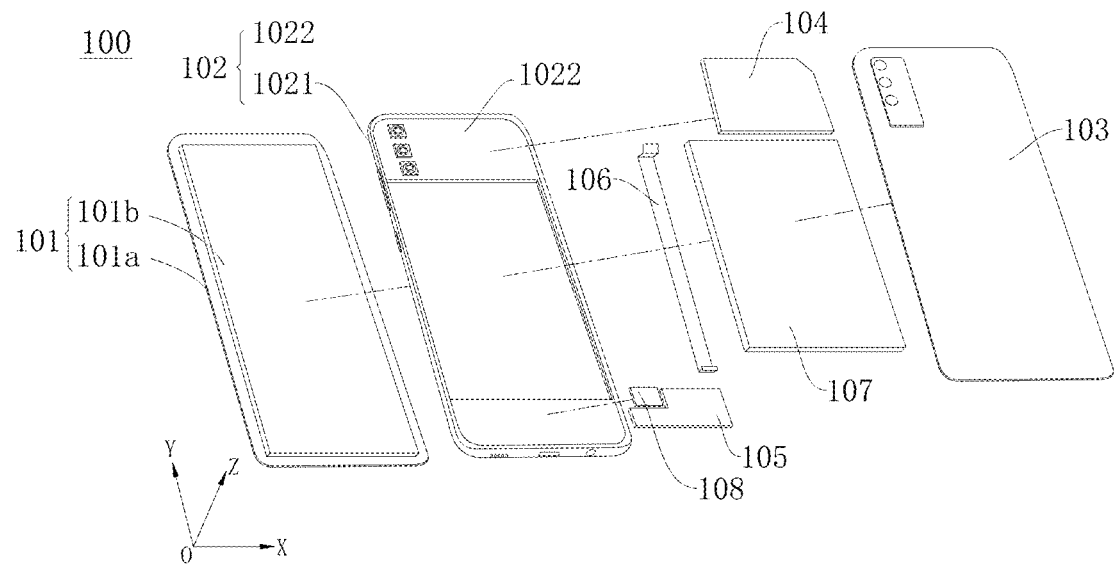
FIG. 2 is an exploded view of the terminal device shown in FIG. 1.

Referring to FIG. 1 and FIG. 2, FIG. 1 is a schematic diagram of a structure of the terminal device 100 according to some embodiments of this application, and FIG. 2 is an exploded view of the terminal device 100 shown in FIG. 1. The terminal device 100 shown in FIG. 1 is described by using the phablet as an example. In this embodiment, the terminal device 100 includes a screen 101, a middle frame 102, a back cover 103, a primary circuit board 104, a secondary circuit board 105, a battery 107, and a vibration motor 108.

It can be understood that FIG. 1, FIG. 2, and the following related accompanying drawings merely show examples of some components included in the terminal device 100. Actual shapes, actual sizes, actual positions, and actual structures of these components are not limited by FIG. 1, FIG. 2, or any of the following accompanying drawings. In addition, when the terminal device 100 is a device in some other forms, the terminal device 100 may alternatively not include the screen 101.

In the embodiment shown in FIG. 1, the terminal device 100 is in the shape of a rectangular flat plate. For ease of description of the following embodiments, an XYZ coordinate system is established. Specifically, a width direction of the terminal device 100 is defined as an X-axis direction, a length direction of the terminal device 100 is defined as a Y-axis direction, and a thickness direction of the terminal device 100 is defined as a Z-axis direction. It can be understood that the coordinate system of the terminal device 100 may be flexibly set based on an actual requirement. This is not specifically limited herein. In some other embodiments, the terminal device 100 may be alternatively in the shape of a square flat plate, a round flat plate, an elliptical flat plate, or the like.

The screen 101 is configured to display images, videos, and the like. Referring to FIG. 2, the screen 101 includes a light-transmitting cover plate 101a and a display 101b (English name: panel, also referred to as display panel). The light-transmitting cover plate 101a and the display 101b are stacked and fixedly connected through adhesion or the like. The light-transmitting cover plate 101a is mainly configured to provide protection and dustproofing functions for the display 101b. A material of the light-transmitting cover plate 101a includes but is not limited to glass. The display 101b may be a flexible display or a rigid display. For example, the display 101b may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light emitting diode (quantum dot light emitting diodes, QLED) display, a liquid crystal display (liquid crystal display, LCD), or the like.

Figure 3:
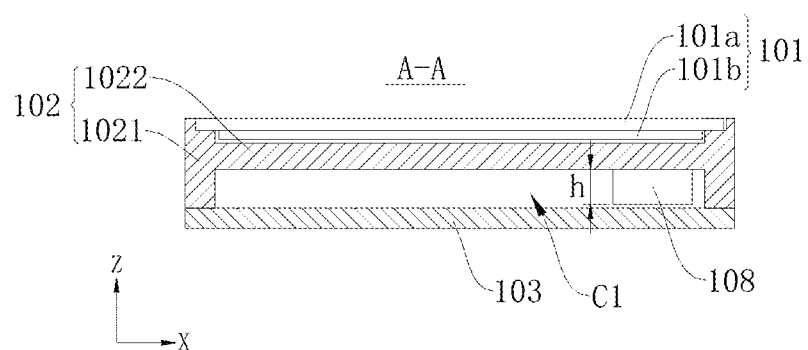
FIG. 3 is a sectional view along line A-A in FIG. 1.

Referring to FIG. 2 and FIG. 3, FIG. 3 is a sectional view along line A-A in FIG. 1. The middle frame 102 includes a bezel 1021 and a middle plate 1022. The bezel 1021 is in the shape of a rectangular ring. The middle plate 1022 is fixed to an inner surface of the bezel 1021 around its perimeter. In other words, the bezel 1021 encircles an outer edge of the middle plate 1022. For example, the middle plate 1022 may be fixed to the bezel 1021 through welding, or the middle plate 1022 and the bezel 1021 may be an integrally formed structure. The screen 101 is fixed to the bezel 1021, and the bezel 1021 may encircle an edge of the screen 101. Specifically, the light-transmitting cover plate 101a is fixed to the bezel 1021. In some embodiments, the light-transmitting cover plate 101a may be fixed to the bezel 1021 through adhesion.

It can be understood that, in other embodiments, the bezel 1021 may be alternatively disposed only on one side edge, two adjacent side edges, two opposite side edges, or three side edges of the middle plate 1022. This is not specifically limited herein.

The back cover 103 is located on a side of the middle plate 1022 farther away from the screen 101, and the back cover 103 is fixed to the bezel 1021. For example, the back cover 103 may be fixedly connected to an end face of an end of the bezel 1021 farther away from the screen 101 through adhesion. Alternatively, the back cover 103 and the bezel 1021 may be an integrally formed structure, that is, the bezel 1021 and the back cover 103 are an integral structure. An accommodating cavity C1 is surrounded by the back cover 103 and the middle frame 102. The primary circuit board 104, the secondary circuit board 105, the battery 107, and the vibration motor 108 may be accommodated in the accommodating cavity C1.

The primary circuit board 104 is configured to integrate a control chip. The control chip may be, for example, an application processor (application processor, AP), a double data rate (double data rate, DDR) synchronous dynamic random access memory, or a universal flash storage (universal flash storage, UFS). In some embodiments, the primary circuit board 104 is electrically connected to the display 101b, and the primary circuit board 104 is configured to control the display 101b to display images or videos.

The primary circuit board 104 may be a rigid circuit board, a flexible circuit board, or a rigid-flex circuit board. The primary circuit board 104 may be an FR-4 dielectric slab, a Rogers (Rogers) dielectric slab, a hybrid FR-4/Rogers dielectric slab, or the like. Herein, FR-4 is a code of a flame-retardant material level, and the Rogers dielectric slab is a high-frequency board.

The secondary circuit board 105 is configured to integrate electronic components such as a radio frequency front-end of an antenna (for example, a 5G antenna) and a universal serial bus (universal serial bus, USB) device. The secondary circuit board 105 may be a rigid circuit board, a flexible circuit board, or a rigid-flex circuit board. The secondary circuit board 105 may be an FR-4 dielectric slab, a Rogers (Rogers) dielectric slab, a hybrid FR-4/Rogers dielectric slab, or the like.

The secondary circuit board 105 is connected to the primary circuit board 104 via a connection component 106, to implement data and signal transmission between the secondary circuit board 105 and the primary circuit board 104. The connection component 106 may be a flexible circuit board (flexible printed circuit, FPC). In another embodiment, the connection component 106 may be alternatively a conducting wire or an enamelled wire.

The battery 107 is located between the primary circuit board 104 and the secondary circuit board 105. The battery 107 is configured to supply power to electronic components such as the display 101b, the primary circuit board 104, and the secondary circuit board 105 in the terminal device 100.

The vibration motor 108 is configured to implement functions such as notification of incoming calls, messages, SMS messages, weather, or news, and haptic feedback for trigger or accidental trigger.

Referring to FIG. 3, the vibration motor 108 is located in the accommodating cavity C1. There may be one or more vibration motors 108 disposed in the terminal device 100. This is not specifically limited herein.

Figure 4:
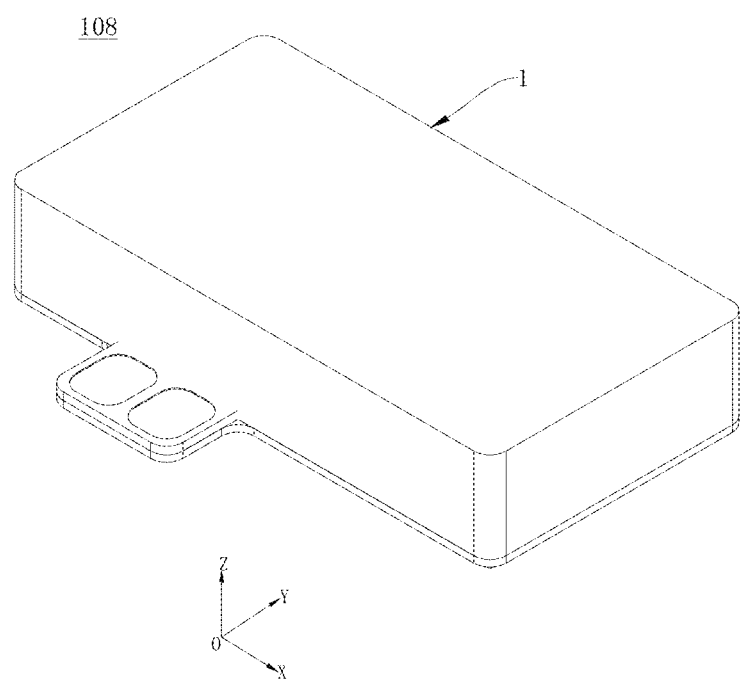
FIG. 4 is a stereogram of a vibration motor in a terminal device shown in FIG. 3.

Specifically, the vibration motor 108 may be fixed to a surface of the side of the middle plate 1022 farther away from the screen 101. Referring to FIG. 4, FIG. 4 is a stereogram of the vibration motor 108 in the terminal device 100 shown in FIG. 3. A coordinate system in FIG. 4 is the same as the coordinate system in FIG. 1. In other words, position relationships between all components in the vibration motor 108 in FIG. 4 in the coordinate system shown in FIG. 4 are the same as position relationships between all the components in the vibration motor 108 in the coordinate system shown in FIG. 1 when the vibration motor 108 is applied to the terminal device 100 shown in FIG. 1.

The vibration motor 108 includes a housing 1. The housing 1 is approximately in the shape of a cuboid. The housing 1 is provided with an accommodating space inside. The accommodating space is used to accommodate components such as a mass block and a driving assembly of the vibration motor 108. A height direction of the housing 1 is parallel to the Z-axis direction. A length direction of the housing 1 is parallel to the X-axis direction. A width direction of the housing 1 is parallel to the Y-axis direction. Certainly, in another embodiment, alternatively, a length direction of the housing 1 may be parallel to the Y-axis direction, and a width direction of the housing 1 is parallel to the X-axis direction.

Figure 5:
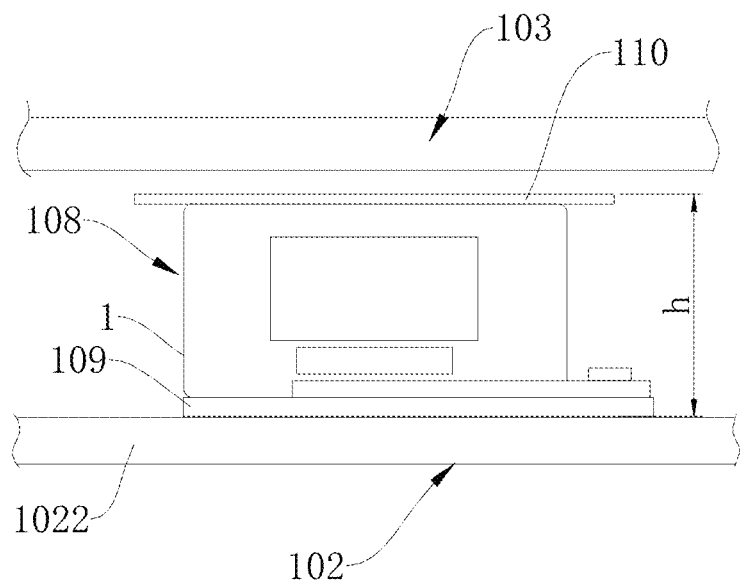
FIG. 5 is a schematic diagram of an assembly structure between the vibration motor shown in FIG. 4, and a middle frame and a back cover.

Referring to FIG. 5, FIG. 5 is a schematic diagram of an assembly structure between the vibration motor 108 shown in FIG. 4, and the middle frame 102 and the back cover 103. The housing 1 is bonded to the middle plate 1022 of the middle frame 102 via an adhesive 109. In another embodiment, the housing 1 may be alternatively fixed to the middle plate 1022 of the middle frame 102 through clamping, threaded connection, or the like. On this basis, to ensure connection stability between the housing 1 and the middle frame 102, a side of the housing 1 farther away from the middle plate 1022 is further provided with a limiting structure 110. The limiting structure 110 is fixedly connected to the middle frame 102. The limiting structure 110 is configured to prevent the housing 1 from moving in a direction leaving the middle plate 1022. In this embodiment, a mounting height h of the vibration motor 108 on the middle frame 102 is a sum of a thickness of the adhesive 109, a height by which the vibration motor 108 protrudes from the middle plate 1022, and a thickness of the limiting structure 110.

It can be understood that, on condition that thicknesses of the screen 101, the middle frame 102, and the back cover 103 are fixed, a height by which the housing 1 of the vibration motor 108 protrudes from the middle plate 1022 is an important factor that affects a thickness of the terminal device 100. In the foregoing embodiment, the housing 1 of the vibration motor 108 is in the shape of a cuboid, and when the vibration motor 108 is mounted on the middle plate 1022 of the middle frame 102, the housing 1 entirely protrudes from the middle plate 1022 in the height direction of the housing 1. In this case, if the terminal device 100 is to be further thinned, a height of the housing 1 needs to be reduced, and volumes of structures such as the mass block, a magnet assembly, a coil, and a damping structure inside the housing 1 also need to be correspondingly reduced, which has considerable impact on performance of the vibration motor 108.

Figure 6:
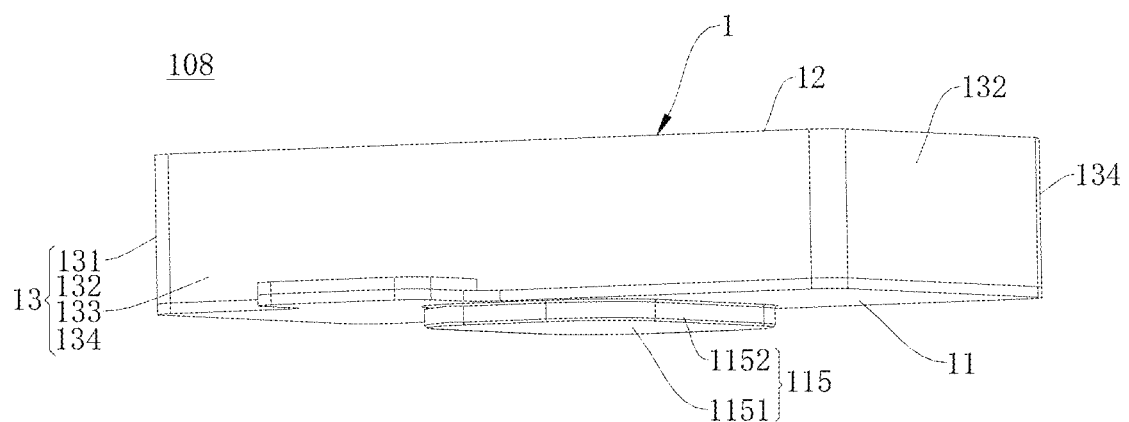
FIG. 6 is a stereogram of a vibration motor according to some embodiments of this application.
Figure 7A:
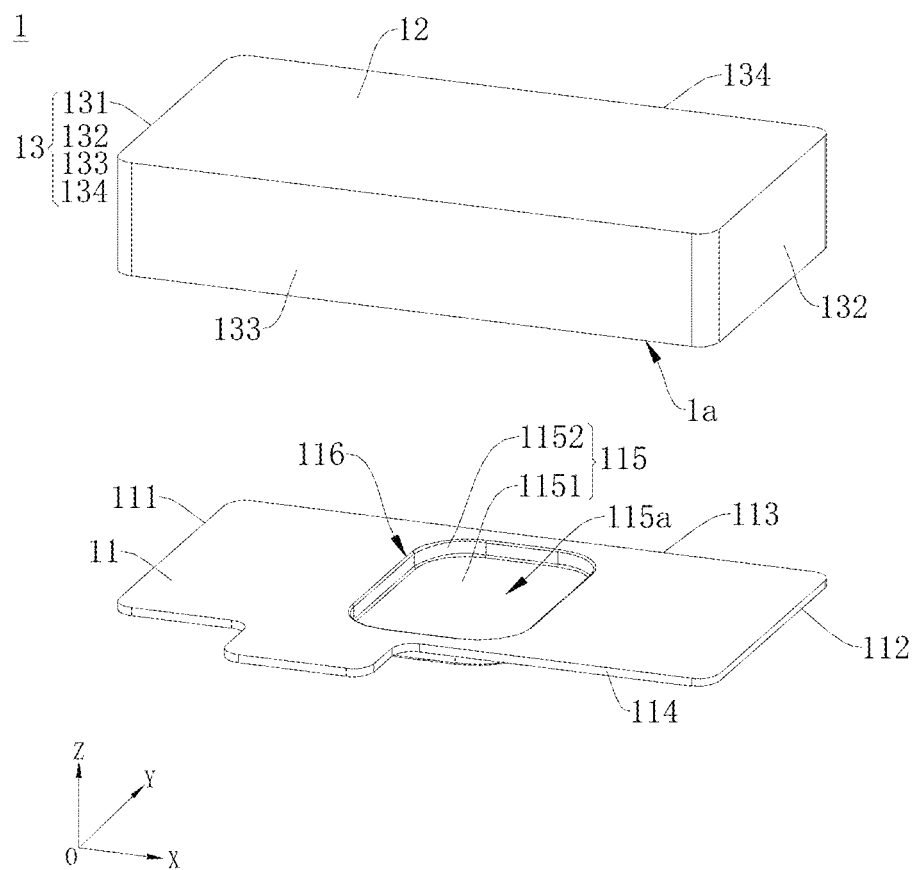
FIG. 7a is an exploded view of a housing of the vibration motor shown in FIG. 6.

To resolve the contradiction between the thickness of the terminal device 100 and the performance of the vibration motor 108, referring to FIG. 6 and FIG. 7a, FIG. 6 is a stereogram of the vibration motor 108 according to some embodiments of this application, and FIG. 7a is an exploded view of the housing 1 of the vibration motor 108 shown in FIG. 6.

Specifically, referring to FIG. 6, the vibration motor 108 includes the housing 1, where the housing 1 is configured to perform waterproofing and dustproofing protection on structures inside the vibration motor 108. A material of the housing 1 is metal, for example, stainless steel. In this way, a thickness of the housing 1 can be designed to be comparatively small on condition that structural strength is ensured. This helps reduce a thickness and volume of the vibration motor 108. In some embodiments, the housing 1 is made of a metallic material having a magnetic insulation property. In this way, the housing 1 can prevent a magnetic field inside the vibration motor 108 from affecting performance of an antenna that is located around the vibration motor 108 and that is in the terminal device 100.

Referring to FIG. 6 and FIG. 7a, the housing 1 includes a side frame 13, a first wall plate 11, and a second wall plate 12. The side frame 13 is in the shape of a rectangular ring. The side frame 13 includes a first side plate 131 and a second side plate 132 that are disposed opposite each other, and a third side plate 133 and a fourth side plate 134 that are disposed opposite each other. The first side plate 131, the third side plate 133, the second side plate 132, and the fourth side plate 134 are sequentially connected end to end, thereby forming the side frame 13 through enclosure. The first wall plate 11 and the second wall plate 12 are disposed at two ends of the side frame 13 and opposite each other. An accommodating space 1a is limited between the first wall plate 11, the side frame 13, and the second wall plate 12. It can be understood that, in another embodiment, the side frame 13 may be alternatively in the shape of a circular ring or an elliptical ring.

In some embodiments, the housing 1 is formed by assembling two or more parts together, or may be formed as a whole through folding. For example, in some embodiments, the side frame 13 and the second wall plate 12 are an integral structure, and the first wall plate 11 is fixedly connected to the side frame 13 through screwing, adhesion, welding, or the like. In some other embodiments, the side frame 13 and the first wall plate 11 are an integral structure, and the second wall plate 12 is fixedly connected to the side frame 13 through screwing, adhesion, welding, or the like. In some still other embodiments, the side frame 13 is an integral structure, and the first wall plate 11 and the second wall plate 12 are fixedly connected to the side frame 13 through screwing, adhesion, welding, or the like. In some still other embodiments, the first wall plate 11 and part of the side frame 13 constitute a first part of the housing 1, and the second wall plate 12 and part of the side frame 13 constitute a second part of the housing 1, where the first part and the second part are fixedly connected to each other through screwing, adhesion, welding, or the like. Optionally, the first part is an integral structure, and the second part is an integral structure.

Specifically, referring to FIG. 7a, the first wall plate 11 is in the shape of a flat plate. For example, the first wall plate 11 is a rectangular plate structure. A length direction of the first wall plate 11 is parallel to the X-axis direction. A width direction of the first wall plate 11 is parallel to the Y-axis direction. The first wall plate 11 has a first short side 111 and a second short side 112 that are opposite each other, and a first long side 113 and a second long side 114 that are opposite each other. An outer surface of the first wall plate 11 is provided with a first protruding portion 115 that protrudes in a direction leaving the accommodating space Ta. The first protruding portion 115 is hollow inside so that a first accommodating compartment 115a is formed. The first accommodating compartment 115a communicates with the accommodating space Ta. In this way, some internal structures such as a coil 42 and a driving assembly 4 of the vibration motor 108 can be accommodated in the first accommodating compartment 115a.

The "outer surface of the first wall plate 11" is a surface of a side of the first wall plate 11 farther away from the accommodating space Ta, that is, a surface of a side of the first wall plate 11 farther away from the second wall plate 12.

Still referring to FIG. 7a, the first wall plate 11 is provided with a through communication opening 116, the first protruding portion 115 is disposed at the communication opening 116, and the first accommodating compartment 115a in the first protruding portion 115 communicates with the accommodating space Ta in the housing 1 through the communication opening 116. Specifically, the first protruding portion 115 includes a first top wall 1151 and a first encircling wall 1152. The first encircling wall 1152 is in the shape of a ring. The first encircling wall 1152 encircles an outer edge of the first top wall 1151. The first accommodating compartment 115a is limited between the first top wall 1151 and the first encircling wall 1152. An end of the first encircling wall 1152 farther away from the first top wall 1151 is fixedly connected to the first wall plate 11. Optionally, the first encircling wall 1152 is perpendicular to the first top wall 1151.

Figure 7B:
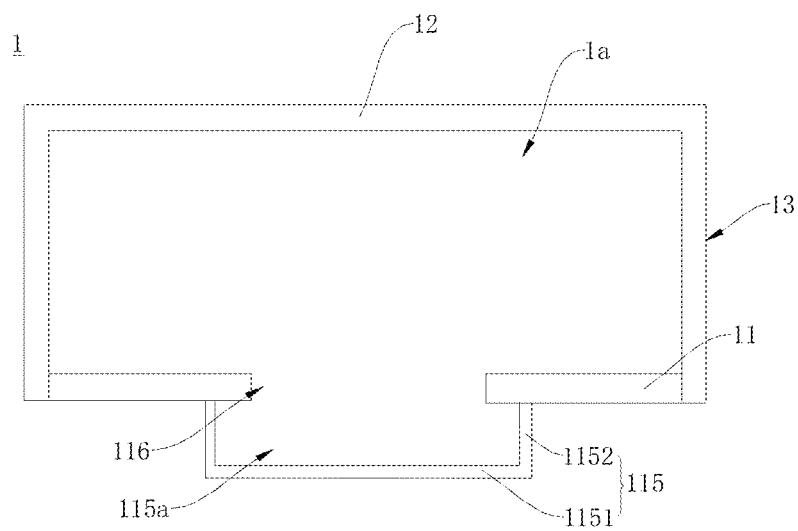
FIG. 7b is a sectional view of a housing of a vibration motor according to some other embodiments of this application.

In some embodiments, an inner surface of the first encircling wall 1152 is level with an inner surface of the communication opening 116. Specifically, an orthographic projection of the first protruding portion 115 on a plane in which the first wall plate 11 is located is a first projection, and an outline of the first projection coincides with an outline of the communication opening 116. In another embodiment, referring to FIG. 7b, FIG. 7b is a sectional view of the housing 1 of the vibration motor 108 according to some other embodiments of this application. The first encircling wall 1152 of the first protruding portion 115 may alternatively surround an outer side of the communication opening 116. In other words, the outline of the first projection is located on an outer side of the outline of the communication opening 116.

In some embodiments, the outline of the orthographic projection of the first protruding portion 115 on the first wall plate 11 is in the shape of a circle, a rectangle, a rounded rectangle, a runway, an ellipse, or an irregular figure. A specific shape of the outline of the first projection may be adjusted and designed based on a shape of a specific component accommodated in the first accommodating compartment 115a. This is not specifically limited in this application.

Figure 8:
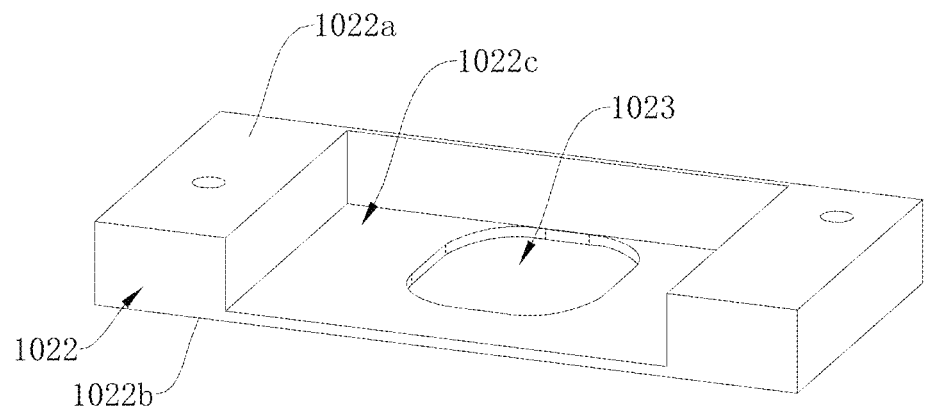
FIG. 8 is a schematic diagram of a partial structure of a middle plate of a middle frame according to some embodiments of this application.

Referring to FIG. 8, FIG. 8 is a schematic diagram of a partial structure of the middle plate 1022 of the middle frame 102 according to some embodiments of this application. The middle plate 1022 has a first surface 1022a and a second surface 1022b that are opposite each other. The first surface 1022a faces the back cover 103. The second surface 1022b faces the screen 101. The first surface 1022a is provided with a recess 1022c recessed toward the second surface 1022b. An opening of the recess 1022c faces away from the screen 101. In other words, the surface of the side of the middle plate 1022 farther away from the screen 101 is provided with the recess 1022c. A bottom wall of the recess 1022c is provided with a first avoiding hole 1023. In this embodiment, the first avoiding hole 1023 is a through hole that penetrates the bottom wall of the recess 1022c. In another embodiment, the first avoiding hole 1023 may be alternatively a blind hole. The "bottom wall of the recess 1022c" is a wall face of the recess 1022c opposite the opening of the recess 1022c.

Figure 9:
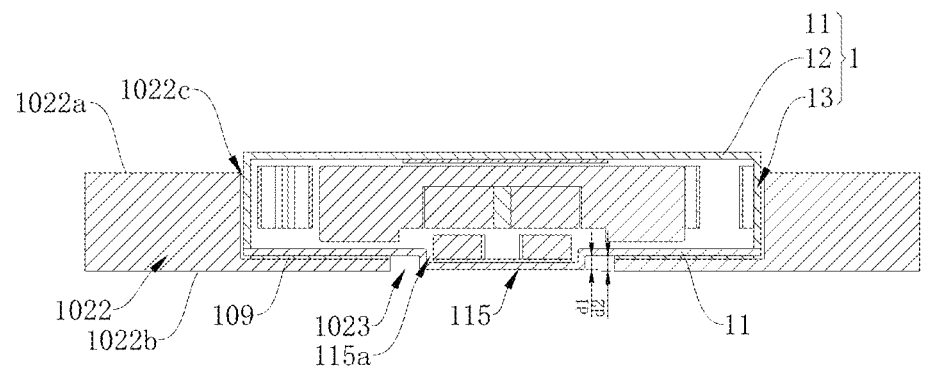
FIG. 9 is a schematic diagram of assembly of the vibration motor shown in FIG. 6 and the middle plate of the middle frame shown in FIG. 8.

Referring to FIG. 9, FIG. 9 is a schematic diagram of assembly of the vibration motor 108 shown in FIG. 6 and the middle plate 1022 of the middle frame 102 shown in FIG. 8. The vibration motor 108 is disposed in the recess 1022c. Specifically, part of the vibration motor 108 may be accommodated in the recess 1022c, and the other part of the vibration motor 108 is located outside the recess 1022c. In another embodiment, alternatively, the entire vibration motor 108 may be disposed in the recess 1022c. In this way, as at least part of the vibration motor 108 is disposed in the recess 1022c, the height by which the vibration motor 108 protrudes from the middle plate 1022 can be reduced, thereby thinning the terminal device 100 and ensuring overall structural strength of the middle frame 102.

In another embodiment, alternatively, the middle plate 1022 may be provided with no recess 1022c. In this case, the first avoiding hole 1023 is directly formed in the middle plate 1022.

Still referring to FIG. 9, the outer surface of the first wall plate 11 faces the middle frame 102, and the first protruding portion 115 is accommodated in the first avoiding hole 1023. In some embodiments, the outer surface of the first wall plate 11 is fixedly connected to the bottom wall of the recess 1022c via the adhesive 109.

Therefore, the first wall plate 11 is provided with the first protruding portion 115 that is hollow inside, so that some components such as the coil and the mass block of the vibration motor 108 can be accommodated in the first accommodating compartment 115a in the first protruding portion 115; in addition, the middle frame 102 is provided with the first avoiding hole 1023 corresponding to the first protruding portion 115, so that the first protruding portion 115 is accommodated in the first avoiding hole 1023. In this way, the height by which the vibration motor 108 protrudes from the middle plate 1022 can be reduced, thereby reducing the mounting height of the vibration motor 108. Therefore, volumes of structures such as the mass block, the coil, the magnet assembly, and the damping structure inside the vibration motor 108 can be increased without increasing overall space occupied by the vibration motor 108, so that overall performance of the vibration motor 108 can be improved without increasing the thickness of the terminal device 100. Moreover, while the volumes of the structures inside the vibration motor 108 are kept unchanged, that is, while original performance of the vibration motor 108 is maintained, the mounting height of the vibration motor 108 can be reduced, so that the space occupied by the vibration motor 108 can be reduced, thereby thinning the terminal device 100.

Referring to FIG. 9, in this embodiment, a distance between an end of the first protruding portion 115 farther away from the first wall plate 11 and the outer surface of the first wall plate 11 is a first distance d1, and a distance between the second surface 1022b (namely, a surface of a side of the middle plate 1022 closer to the screen 101) of the middle plate 1022 and the outer surface of the first wall plate 11 is a second distance d2. The first distance d1 is less than the second distance d2. In another embodiment, alternatively, the first distance d1 may be equal to the second distance d2. In this way, the first protruding portion 115 can be prevented from extending out of the first avoiding hole 1023, thereby avoiding interference between the first protruding portion 115 and a component such as the screen 101 of the terminal device 100.

Based on the foregoing embodiment, to increase connection strength between the first protruding portion 115 and the first wall plate 11 and simplify a processing process, the first protruding portion 115 and the first wall plate 11 are an integral structure. For example, the first protruding portion 115 may be formed through stamping by using a stamping process.

Figure 10A:
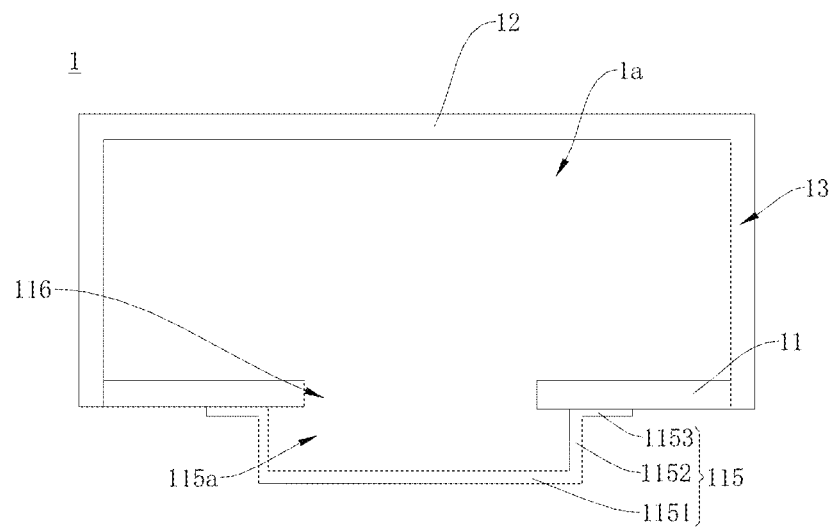
FIG. 10a is a sectional view of a housing of a vibration motor according to some other embodiments of this application.

In another embodiment, alternatively, the first protruding portion 115 and the first wall plate 11 may be separated in structure. In this case, the first protruding portion 115 may be fixedly connected to the first wall plate 11 through adhesion, welding, clamping, screwing, or the like. On this basis, to increase a contact area between the first protruding portion 115 and the first wall plate 11 and reduce assembly difficulty, referring to FIG. 10a, FIG. 10a is a sectional view of the housing 1 of the vibration motor 108 according to some other embodiments of this application. The first protruding portion 115 in this embodiment further includes a flanging portion 1153 in addition to the first encircling wall 1152 and the first top wall 1151 of the first protruding portion 115 shown in FIG. 9.

Referring to FIG. 10a, one end of the flanging portion 1153 is fixedly connected to the end of the first encircling wall 1152 farther away from the first top wall 1151, and the other end of the flanging portion 1153 extends in a direction leaving the first encircling wall 1152. Optionally, the flanging portion 1153 is parallel to the plane in which the first wall plate 11 is located. The first protruding portion 115 may be fixedly connected to the first wall plate 11 via the flanging portion 1153.

Figure 10B:
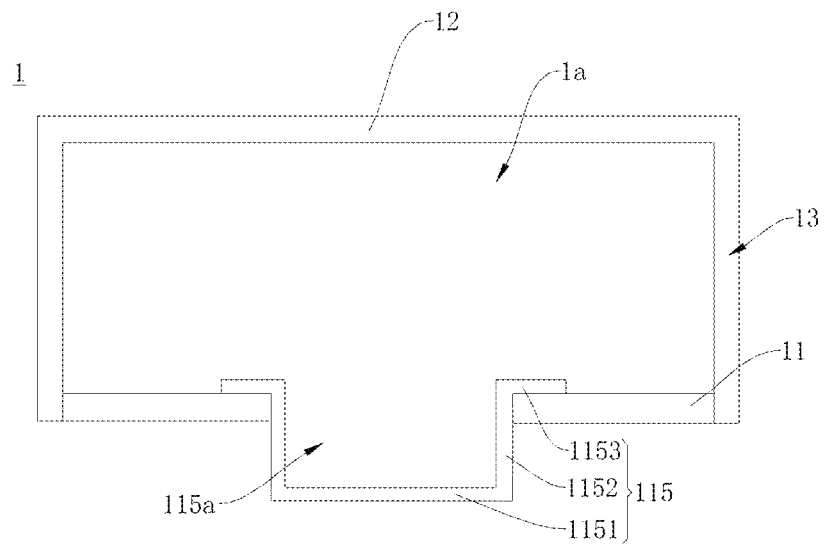
FIG. 10b is a sectional view of a housing of a vibration motor according to some still other embodiments of this application.
Figure 10C:
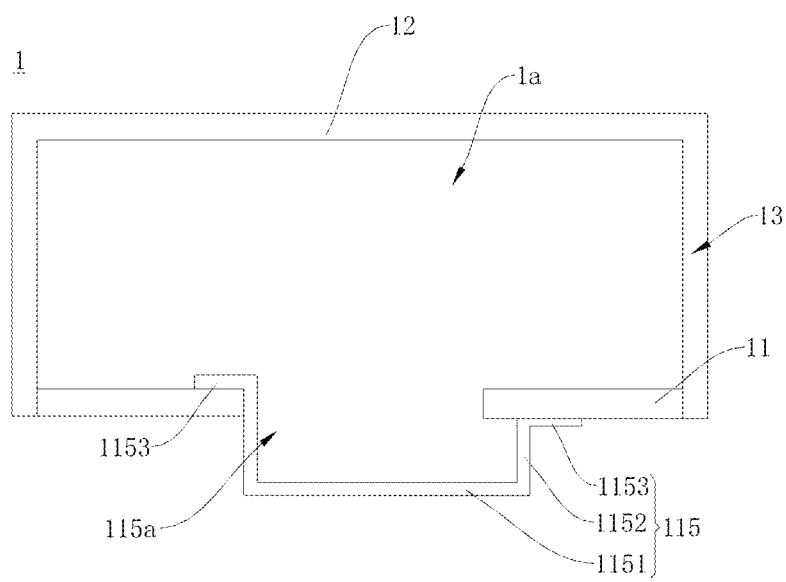
FIG. 10c is a sectional view of a housing of a vibration motor according to some still other embodiments of this application.

For example, in the embodiment shown in FIG. 10a, the flanging portion 1153 is fixedly connected to the outer surface of the first wall plate 11. In some other embodiments, referring to FIG. 10b, FIG. 10b is a sectional view of the housing 1 of the vibration motor 108 according to some still other embodiments of this application. In the embodiments, the flanging portion 1153 is fixedly connected to an inner surface of the first wall plate 11. In some still other embodiments, referring to FIG. 10c, FIG. 10c is a sectional view of the housing 1 of the vibration motor 108 according to some still other embodiments of this application. In the embodiments, part of the flanging portion 1153 is fixedly connected to an inner surface of the first wall plate 11, and the other part of the flanging portion 1153 is fixedly connected to the outer surface of the first wall plate 11.

The following describes an internal structure of the vibration motor 108 in some embodiments of this application. There are a plurality of types of internal structures of the vibration motor 108.

Figure 11:
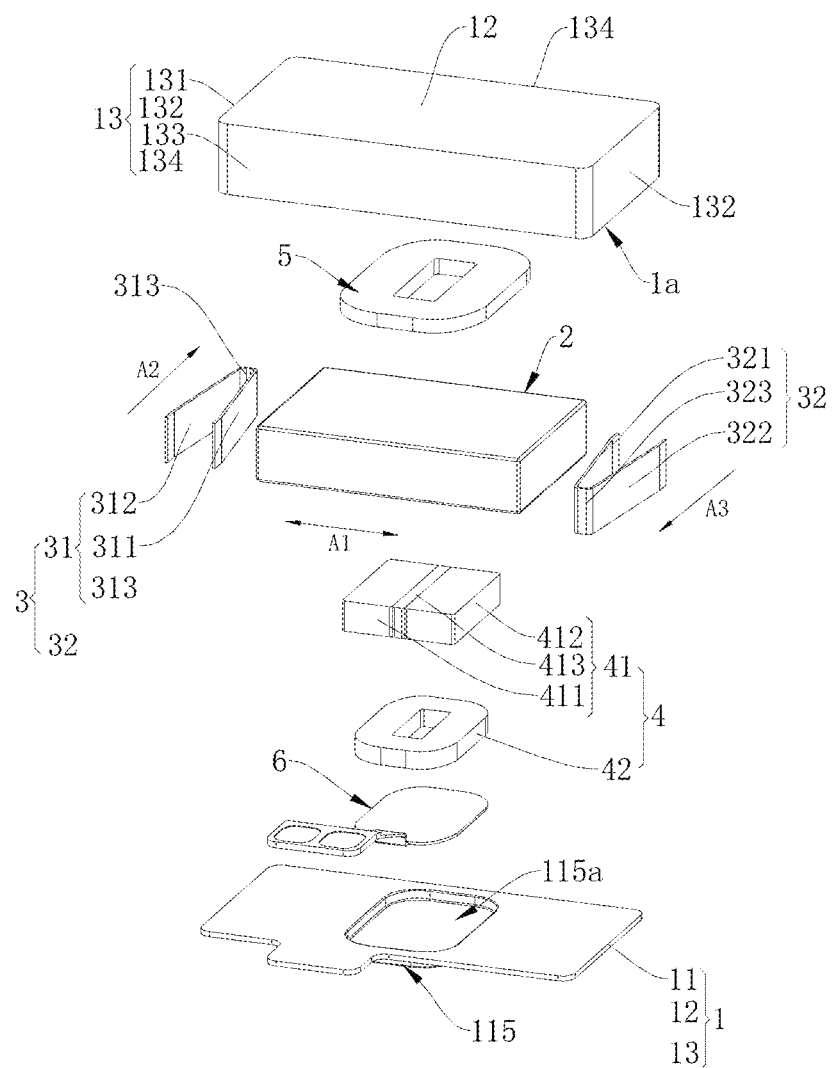
FIG. 11 is an exploded view of the vibration motor shown in FIG. 6.
Figure 12:
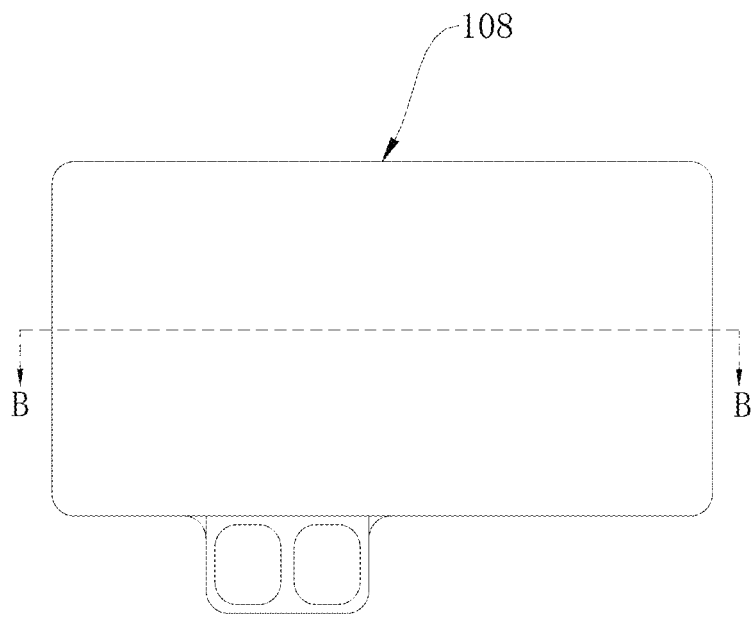
FIG. 12 is a top view of the vibration motor shown in FIG. 6.
Figure 13:
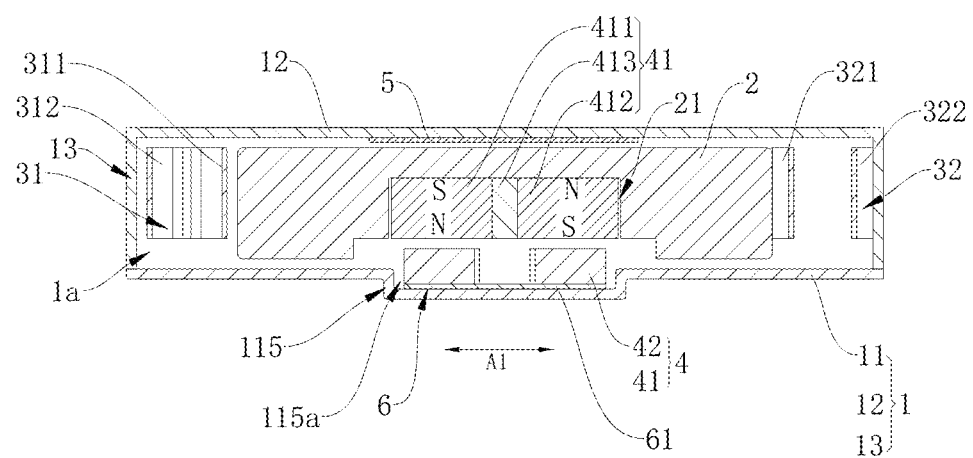
FIG. 13 is a sectional view along line B-B in FIG. 12.

For example, referring to FIG. 11 to FIG. 13, FIG. 11 is an exploded view of the vibration motor 108 shown in FIG. 6, FIG. 12 is a top view of the vibration motor 108 shown in FIG. 6, and FIG. 13 is a sectional view along line B-B in FIG. 12. In addition to the housing 1, the vibration motor 108 further includes a mass block 2, an elastic assembly 3, a driving assembly 4, a damping structure 5, and an electrical connection structure 6. It should be noted that FIG. 11 to FIG. 13 merely show an example of some components included in the vibration motor 108. Actual shapes, actual sizes, actual positions, and actual structures of these components are not limited by FIG. 11 to FIG. 13.

The mass block 2 is located in the housing 1. The mass block 2 is in the shape of a cuboid. In some other embodiments, the mass block 2 may be alternatively in the shape of a cube, a sphere, an ellipsoid, an irregular shape, or the like. As a vibration body in the vibration motor 108, the mass block 2 can reciprocatively vibrate in a plane that is parallel to the plane in which the first wall plate 11 is located. Specifically, in the plane that is parallel to the plane in which the first wall plate 11 is located, a vibration path of the mass block 2 may be a straight line or a curve.

Referring to FIG. 11 and FIG. 13, the vibration path of the mass block 2 is a straight line. Specifically, the mass block 2 may reciprocatively vibrate along a direction A1. In other words, the vibration motor 108 is a transverse linear motor. When the vibration motor 108 is applied to the terminal device 100, a vibration direction of the mass block 2 is perpendicular to the thickness direction of the terminal device 100. This helps reduce the mounting height of the vibration motor 108 in the terminal device 100. In some other embodiments, alternatively, a vibration direction of the mass block 2 may be perpendicular to the plane in which the first wall plate 11 is located. In this case, the vibration motor 108 is a longitudinal linear motor. When the vibration motor 108 is applied to the terminal device 100, the vibration direction of the mass block 2 is the same as the thickness direction of the terminal device 100. In some still other embodiments, the vibration motor 108 may be alternatively a rotor motor.

In some embodiments, the vibration motor 108 may be an X-axis vibration motor, and the mass block 2 vibrates along the X-axis direction, so that the terminal device 100 generates vibration in the X-axis direction. It can be understood that the vibration direction of the mass block 2 may be set based on an actual requirement. This is not limited in this application. All of the following embodiments are described based on the case that the vibration motor 108 is the X-axis vibration motor, which shall not be considered as a special limitation on this application.

The elastic assembly 3 is configured to elastically support the mass block 2 in the housing 1, and the elastic assembly 3 allows the mass block 2 to reciprocatively vibrate along the direction A1 in the housing 1. In some embodiments, referring to FIG. 11 and FIG. 13, the elastic assembly 3 includes a first elastic part 31 and a second elastic part 32. The first elastic part 31 and the second elastic part 32 are both spring plates. An arrangement direction of the first elastic part 31, the mass block 2, and the second elastic part 32 is parallel to the vibration direction A1 of the mass block 2.

Referring to FIG. 11 and FIG. 13, the first elastic part 31 includes a first fixing portion 311, a first connection portion 313, and a second fixing portion 312 that are sequentially connected. The first fixing portion 311 is connected to the mass block 2, where manners of the connection include but are not limited to welding and bonding. The second fixing portion 312 is connected to the first side plate 131 of the side frame 13 in the housing 1, where manners of the connection include but are not limited to welding and bonding. The first connection portion 313 is approximately n-shaped. An arching direction A2 of the first connection portion 313 is parallel to the plane in which the first wall plate 11 is located, and the arching direction A2 of the first connection portion 313 is perpendicular to the vibration direction A1 of the mass block 2.

Still referring to FIG. 11 and FIG. 13, the second elastic part 32 includes a third fixing portion 321, a second connection portion 323, and a fourth fixing portion 322 that are sequentially connected. The third fixing portion 321 is connected to the mass block 2, where manners of the connection include but are not limited to welding and bonding. The fourth fixing portion 322 is connected to the second side plate 132 of the side frame 13 in the housing 1, where manners of the connection include but are not limited to welding and bonding. The second connection portion 323 is approximately n-shaped. An arching direction A3 of the second connection portion 323 is opposite to the arching direction A2 of the first connection portion 313.

In this way, the first elastic part 31 and the second elastic part 32 are both capable of deforming along a direction parallel to the vibration direction A1 of the mass block 2. When the mass block 2 vibrates in a direction approaching the first side plate 131, an included angle between two arm portions of the first connection portion 313 is reduced, and an included angle between two arm portions of the second connection portion 323 is increased. When the mass block 2 vibrates in a direction approaching the second side plate 132, the included angle between the two arm portions of the first connection portion 313 is increased, and the included angle between the two arm portions of the second connection portion 323 is reduced. Such a structure is simple and easy to implement.

It should be noted that, on condition of ensuring that the elastic assembly 3 can elastically support the mass block 2 in the housing 1 and the elastic assembly 3 allows the mass block 2 to reciprocatively vibrate along the direction A1 in the housing 1, the elastic assembly 3 may be alternatively designed into another structural form, which is not specifically limited herein.

The driving assembly 4 is configured to drive the mass block 2 to reciprocatively vibrate in the plane that is parallel to the plane in which the first wall plate 11 is located. In some embodiments, referring to FIG. 11, the driving assembly 4 includes a magnet assembly 41 and a coil 42. The magnet assembly 41 is fixed to the mass block 2. The coil 42 is configured to cooperate with the magnet assembly 41 to drive the mass block 2 to reciprocatively vibrate relative to the housing 1 in the plane that is parallel to the plane in which the first wall plate 11 is located. Specifically, the coil 42 and the magnet assembly 41 cooperate to generate a Lorentz force, and the Lorentz force can drive the mass block 2 to reciprocatively vibrate in the plane that is parallel to the plane in which the first wall plate 11 is located.

Figure 14:
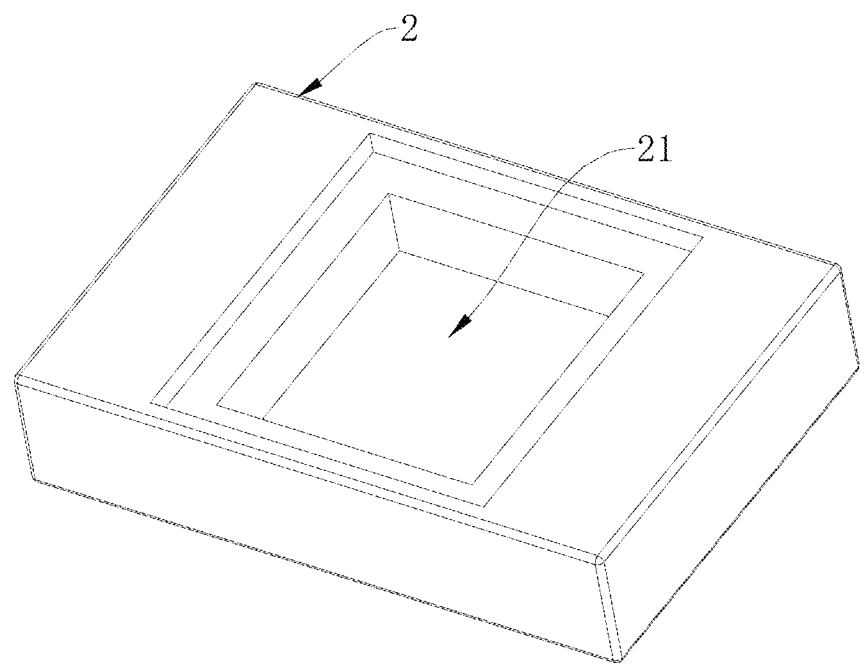
FIG. 14 is a stereogram of a mass block in the vibration motor shown in FIG. 11.

In some embodiments, referring to FIG. 13 and FIG. 14, FIG. 14 is a stereogram of the mass block 2 in the vibration motor 108 shown in FIG. 11. The mass block 2 is provided with a mounting slot 21, and the magnet assembly 41 is accommodated and fixed in the mounting slot 21. Specifically, one end of the mounting slot 21 is open, and the open end of the mounting slot 21 faces the first wall plate 11. In this way, an overall height of the vibration motor 108 can be reduced. Certainly, in some other embodiments, both ends of the mounting slot 21 may be open. Alternatively, in another embodiment, the mass block 2 may be provided with no mounting slot 21. In this case, the magnet assembly 41 may be disposed on an outer surface of the mass block 2.

The coil 42 and the magnet assembly may be arranged in the height direction of the housing 1. Specifically, the coil 42 is located on a side of the magnet assembly 41 closer to the first wall plate 11.

Figure 15:
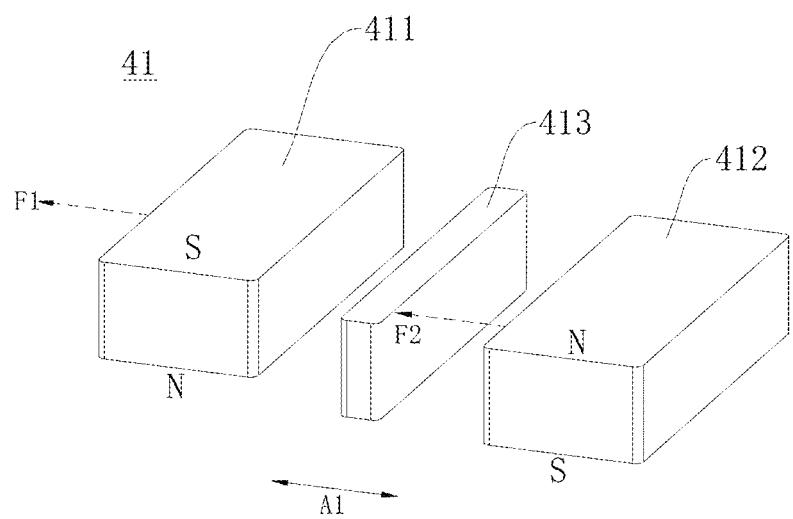
FIG. 15 is an exploded view of a magnet assembly in the vibration motor shown in FIG. 11.

Referring to FIG. 13 and FIG. 15, FIG. 15 is an exploded view of the magnet assembly 41 in the vibration motor 108 shown in FIG. 11. Specifically, the magnet assembly 41 includes a first magnet 411, a second magnet 412, and a magnetoconductive part 413. The first magnet 411 and the second magnet 412 are arranged at an interval in a direction parallel to the first wall plate 11. Specifically, the first magnet 411 and the second magnet 412 are arranged at an interval in the direction A1. The first magnet 411 and the second magnet 412 may be iron magnets or steel magnets. A magnetization direction of the first magnet 411 and a magnetization direction of the second magnet 412 are both perpendicular to the plane in which the first wall plate 11 is located, and the magnetization direction of the first magnet 411 is opposite to the magnetization direction of the second magnet 412. The magnetization direction is a direction from the north pole (namely, the N pole) to the south pole (namely, the S pole).

The magnetoconductive part 413 is located between the first magnet 411 and the second magnet 412. Specifically, the first magnet 411 and the second magnet 412 are fixedly connected to two opposite side faces of the magnetoconductive part 413, respectively. The magnetoconductive part 413 may be a yoke made of stacked silicon steel sheets. Therefore, the magnetoconductive part 413 is disposed between the first magnet 411 and the second magnet 412, so that magnetic current strength between the first magnet 411 and the second magnet 412 can be increased, thereby increasing strength of driving the mass block 2. In this way, a vibration effect is good, and magnetic leakage can be reduced, thereby increasing energy utilization. In addition, the first magnet 411 and the second magnet 412 may be integrated by using the magnetoconductive part 413, thereby facilitating overall assembly of the magnet assembly 41.

For example, referring to FIG. 15 and FIG. 13, an end of the first magnet 411 farther away from the first wall plate 11 is the S pole and an end of the first magnet 411 closer to the first wall plate 11 is the N pole, whereas an end of the second magnet 412 farther away from the first wall plate 11 is the N pole and an end of the second magnet 412 closer to the first wall plate 11 is the S pole. In some other embodiments, alternatively, an end of the first magnet 411 farther away from the first wall plate 11 may be the N pole and an end of the first magnet 411 closer to the first wall plate 11 is the S pole, in which case an end of the second magnet 412 farther away from the first wall plate 11 is the S pole and an end of the second magnet 412 closer to the first wall plate 11 is the N pole.

When the coil 42 is powered on, the first magnet 411 and the second magnet 412 generate Lorentz forces F1 and F2 whose directions are parallel to the direction A1. The direction of F1 is the same as that of F2. A combination of F1 and F2 can drive the mass block 2 to unidirectionally move in the plane that is parallel to the plane in which the first wall plate 11 is located. On this basis, the mass block 2 can be driven to reciprocatively vibrate through current commutation of the coil 42. In some other embodiments, the magnet assembly 41 may alternatively include only one of the first magnet 411 and the second magnet 412, so that one of F1 and F2 drives the mass block 2 to move in the plane that is parallel to the plane in which the first wall plate 11 is located.

It can be understood that, in some other embodiments, the magnet assembly 41 may alternatively include only the first magnet 411 and the second magnet 412 and be provided with no magnetoconductive part 413. In some still other embodiments, alternatively, a third magnet rather than the magnetoconductive part 413 may be disposed between the first magnet 411 and the second magnet 412, where the third magnet is an iron magnet or a steel magnet. A Halbach array is formed between the first magnet 411, the second magnet 412, and the third magnet, so that magnetic forces can be concentrated toward the mass block 2, thereby increasing strength of driving the mass block 2. The Halbach array is a permanent-magnet arrangement manner, where permanent magnets with different magnetization directions are arranged in a specific order, so that a magnetic field on one side of the Halbach array is significantly strengthened and a magnetic field on the other side of the Halbach array is significantly weakened.

The electrical connection structure 6 is configured to lead an electrode of the coil 42 out of the housing 1. The electrical connection structure 6 may be but is not limited to a printed circuit board (printed circuit board, PCB), a flexible circuit board (flexible printed circuit board, FPC), or a structure formed by connecting a plurality of conducting wires via a flexible structure.

Figure 16:
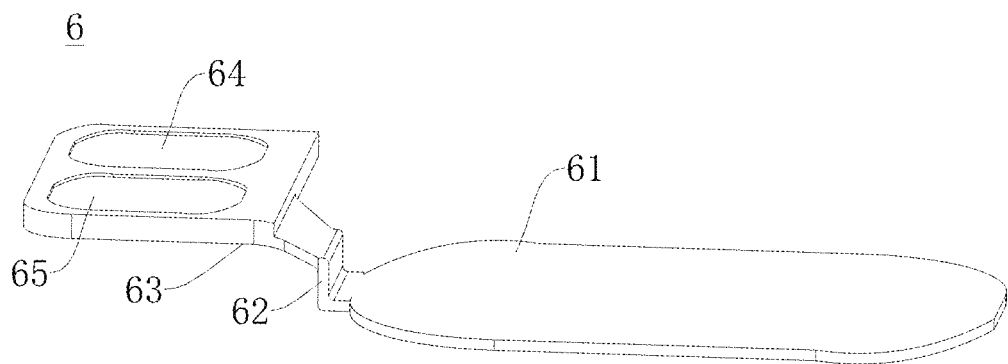
FIG. 16 is a stereogram of an electrical connection structure in the vibration motor shown in FIG. 11.
Figure 17:
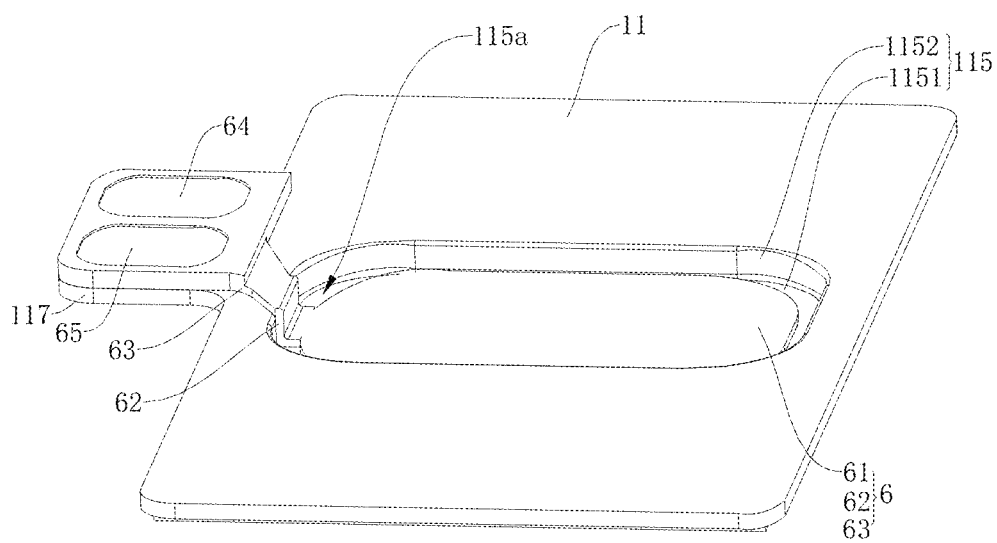
FIG. 17 is a schematic diagram of assembly of the electrical connection structure shown in FIG. 16 and a first wall plate.

Referring to FIG. 16, FIG. 16 is a stereogram of the electrical connection structure 6 in the vibration motor 108 shown in FIG. 11. The electrical connection structure 6 includes a first segment 61, a second segment 62, and a third segment 63 that are sequentially connected. Referring to FIG. 17, FIG. 17 is a schematic diagram of assembly of the electrical connection structure 6 shown in FIG. 16 and the first wall plate 11. The first segment 61 is fixed to a compartment bottom wall of the first accommodating compartment 115*a*, and the second segment 62 is fixed to an inner side wall of the first accommodating compartment 115*a*. In other words, the first segment 61 is fixed to an inner surface of the first top wall 1151, and the second segment 62 is fixed to an inner surface of the first encircling wall 1152. The coil 42 is fixed to the first segment 61 and electrically connected to the first segment 61. An extension path of the third segment 63 is parallel to the plane in which the first wall plate 11 is located, and part of the third segment 63 is located outside the housing 1. The part of the third segment 63 located outside the housing 1 is provided with a positive terminal 64 and a negative terminal 65. The electrical connection structure 6 may be electrically connected to the primary circuit board 104 or the secondary circuit board 105 via the positive terminal 64 and the negative terminal 65, thereby implementing an electrical connection between the coil 42 and the primary circuit board 104 or the secondary circuit board 105.

Based on the foregoing embodiment, to support and fix the part of the electrical connection structure 6 located outside the housing 1, in some embodiments, referring to FIG. 17, the first wall plate 11 is provided with a supporting portion 117. The supporting portion 117 and the first wall plate 11 are coplanar. The part of the electrical connection structure 6 located outside the housing 1 is fixedly connected to the supporting portion 117.

Optionally, the supporting portion 117 and the first wall plate 11 are an integral structure. In other words, the supporting portion 117 and the first wall plate 11 are integrated. This can simplify a processing process of the vibration motor 108, reduce processing costs, and increase connection strength between the supporting portion 117 and the first wall plate 11.

It can be understood that, in another embodiment, the first wall plate 11 may be alternatively provided with no supporting portion 117. In the embodiment, when the vibration motor 108 is applied to the terminal device 100, the third segment 63 of the electrical connection structure 6 may be fixed and supported via the middle frame 102. In other words, when the vibration motor 108 is applied to the terminal device 100, the third segment 63 of the electrical connection structure 6 is attached and fixed to the middle frame 102, thereby fixing and supporting the third segment 63 via the middle frame 102.

In the embodiment, referring to FIG. 13, part of the coil 42 may be located in the first accommodating compartment 115*a*, and the other part of the coil 42 is located in the accommodating space Ta. In this way, the accommodating space Ta occupied by the coil 42 in the housing 1 can be reduced. In another embodiment, alternatively, the entire coil 42 may be accommodated in the first accommodating compartment 115*a*. Optionally, a shape of the first accommodating compartment 115*a* is adapted to a shape of the coil 42. In this way, space utilization in the first accommodating compartment 115*a* can be maximized, and assembly difficulty of the coil 42 can be reduced.

On this basis, to make a structure of the vibration motor 108 more compact, still referring to FIG. 13, an end of the coil 42 farther away from the first wall plate 11 is accommodated in the mounting slot 21. In this case, part of the coil 42 may be accommodated in the first accommodating compartment 115*a*, and the other part of the coil 42 may be accommodated in the mounting slot 21.

The damping structure 5 is configured to provide damping for the mass block 2 so as to implement a function of quickly stopping vibration of the mass block 2. In some embodiments, the damping structure 5 and the coil 42 cooperate to provide electromagnetic damping for the mass block 2. Referring to FIG. 11 and FIG. 13, the damping structure 5 forms a plate structure, and the damping structure 5 may be located on a side of the magnet assembly 41 farther away from the coil 42. In other words, the damping structure 5 and the coil 42 are respectively located on two sides of the magnet assembly 41. In another embodiment, alternatively, the damping structure 5 and the coil 42 may be located on one side of the magnet assembly 41. Specifically, referring to FIG. 13, the damping structure 5 may be bonded or welded to an inner surface of the second wall plate 12.

To ensure a damping effect of the damping structure 5, the damping structure 5 may be made of a material whose resistivity is low. For example, the damping structure 5 may be a metal piece such as an iron piece, an aluminum piece, a copper piece, or a silver piece. On this basis, to reduce costs of the damping structure 5 in addition to ensuring the damping effect of the damping structure 5, the damping structure 5 may be a ring-shaped damping copper plate.

When the coil 42 is powered on, the coil 42 generates a changing electromagnetic field, and the magnet assembly 41 is subject to a magnetic field force. Under the action of the magnetic field force, the mass block 2 performs simple harmonic motion between the first elastic part 31 and the second elastic part 32. Meanwhile, a magnetic line of the magnet assembly 41 cuts a magnetic induction line of the damping copper plate, and an induced current and an induced electromotive force are to be generated in the damping copper plate. When the coil 42 is powered off, a magnetic field force generated by the induced current of the damping copper plate obstructs motion of the mass block 2, so that the mass block 2 can quickly stop vibrating.

In some other embodiments, the damping structure 5 may be alternatively a magnetic liquid. The magnetic liquid is a colloidal substance having a magnetic property. For example, outer layers of nanometric-scale magnetic particles (for example, nickel, cobalt, or iron oxides) are wrapped with a long-chain surfactant, and then the particles are evenly dispersed in a base fluid such as water, organic solvent, or oil, thereby forming a homogeneous and stable colloidal liquid. For example, a region between the magnet assembly 41 and the coil 42 may be filled with the magnetic liquid. Specifically, the magnetic liquid may adhere to an outer surface of the magnet assembly 41. When the mass block 2 is vibrating, the magnetic liquid is compressed, and can generate a damping effect on the mass block 2 due to comparatively large viscosity resistance of the magnetic liquid.

In another embodiment, the damping structure 5 may be alternatively a magnetic liquid, a silica gel, a foam, or the like.

In the foregoing embodiments, as the first segment 61 of the electrical connection structure 6 and part of the coil 42 are accommodated in the first accommodating compartment 115a, the accommodating space 1a occupied by the electrical connection structure 6 and the coil 42 in the housing 1 can be reduced, so that the structure of the vibration motor 108 is more compact; in addition, the volumes of the structures such as the mass block 2 and the magnet assembly 41 of the vibration motor 108 can be increased without increasing the overall mounting height of the vibration motor 108, so that the overall performance of the vibration motor 108 can be improved without increasing the thickness of the terminal device 100. Furthermore, while the volumes of the structures inside the vibration motor 108 are kept unchanged, that is, while the volumes of the magnet assembly 41, the mass block 2, and the like are not reduced and therefore the original performance of the vibration motor 108 is maintained, the mounting height of the vibration motor 108 can be reduced, thereby thinning the terminal device 100.

It can be understood that, in another embodiment, alternatively, another structure in the vibration motor 108 may be disposed in the first accommodating compartment 115a.

Figure 18:
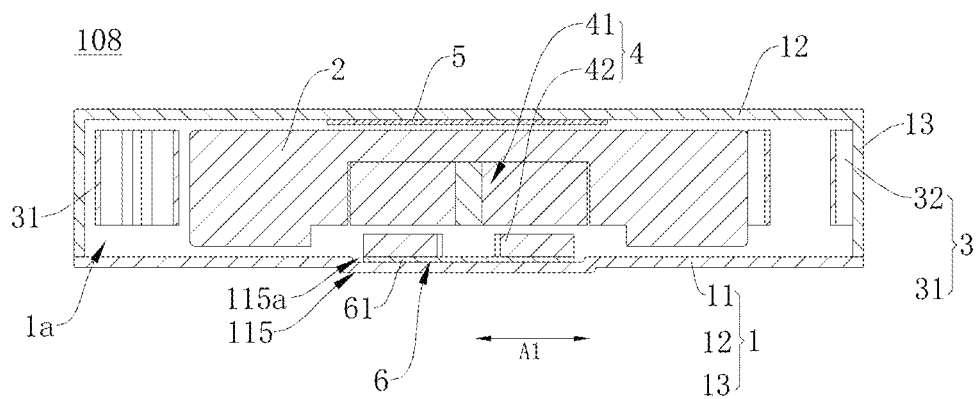
FIG. 18 is a sectional view of a vibration motor according to some other embodiments of this application.
Figure 19:
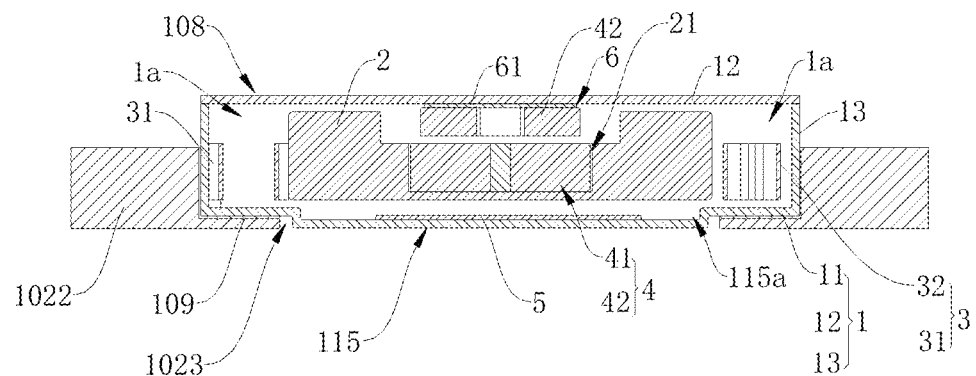
FIG. 19 is a schematic diagram of assembly of a vibration motor and a middle frame according to some still other embodiments of this application.

For example, in some other embodiments, referring to FIG. 18, FIG. 18 is a sectional view of the vibration motor 108 according to some other embodiments of this application. A difference between the vibration motor 108 in this embodiment and the vibration motor 108 shown in FIG. 13 lies in that, in the vibration motor 108 in the embodiment shown in FIG. 13, the first segment 61 of the electrical connection structure 6 and part of the coil 42 are disposed in the first accommodating compartment 115a, whereas in the vibration motor 108 in this embodiment, only the first segment 61 of the electrical connection structure 6 is disposed in the first accommodating compartment 115a and the entire coil 42 is located in the accommodating space Ta. In this way, the electrical connection structure 6 can be prevented from occupying the accommodating space 1a in the housing 1, so that the structure of the vibration motor 108 can also be more compact. In some still other embodiments, referring to FIG. 19, FIG. 19 is a schematic diagram of assembly of the vibration motor 108 and the middle frame 102 according to some still other embodiments of this application. A difference between the vibration motor 108 in this embodiment and the vibration motor 108 shown in FIG. 18 lies in that the damping structure 5 of the vibration motor in this embodiment is disposed in the first accommodating compartment 115a, the first segment 61 of the electrical connection structure 6 is fixed to an inner surface of the second wall plate 12, and the coil 42 is fixedly connected to the first segment 61 of the electrical connection structure 6. On this basis, to increase sensitivity of cooperation between the coil 42 and the magnet assembly 41, an opening of the mounting slot 21 of the mass block 2 in this embodiment faces the second wall plate 12. In other words, the mass block 2 in this embodiment is rotated by 180° relative to the mass block 2 in the vibration motor 108 shown in FIG. 18.

Figure 20A:
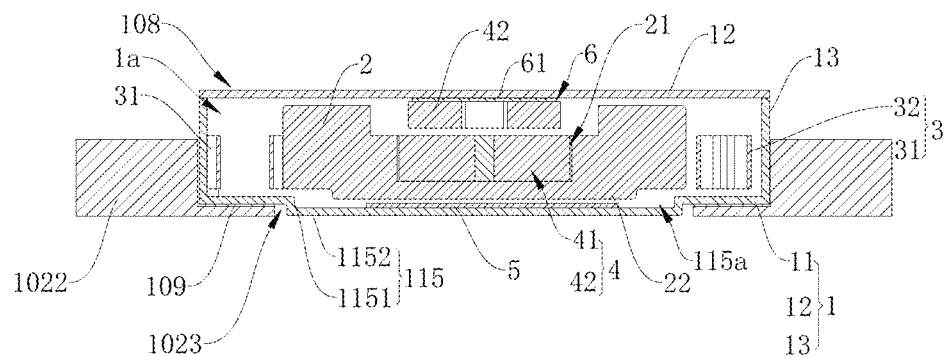
FIG. 20a is a schematic diagram of assembly of a vibration motor and a middle frame according to some still other embodiments of this application.
Figure 20B:
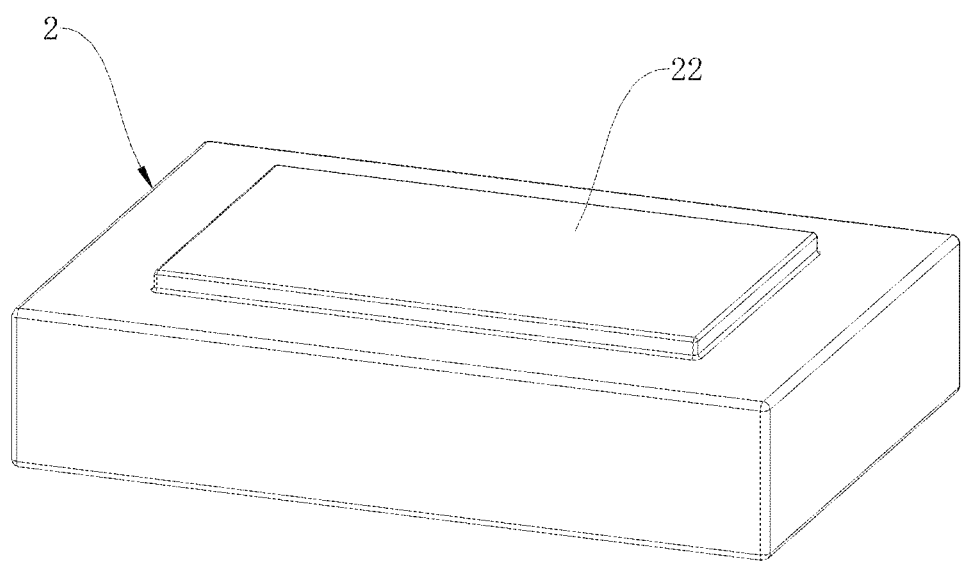

In some still other embodiments, referring to FIG. 20a, FIG. 20a is a schematic diagram of assembly of the vibration motor 108 and the middle frame 102 according to some still other embodiments of this application. A difference between the vibration motor 108 in this embodiment and the vibration motor 108 shown in FIG. 19 lies in that, in the vibration motor 108 in this embodiment, not only the damping structure 5 but also part of the mass block 2 is disposed in the first accommodating compartment 115a. Specifically, referring to FIG. 20a and FIG. 20b, FIG. 20b is a stereogram of the mass block 2 in the vibration motor 108 shown in FIG. 20a. The mass block 2 in this embodiment is provided with a second protruding portion 22. The damping structure 5 and the second protruding portion 22 are both accommodated in the first accommodating compartment 115a.

On this basis, to avoid interference between the second protruding portion 22 and the first encircling wall 1152 of the first protruding portion 115 during motion of the mass block 2, an outer encircling wall of the second protruding portion 22 and the first encircling wall 1152 of the first protruding portion 115 need to be disposed at an interval, and a vibration stroke of the mass block 2 needs to be reserved.

Figure 21:
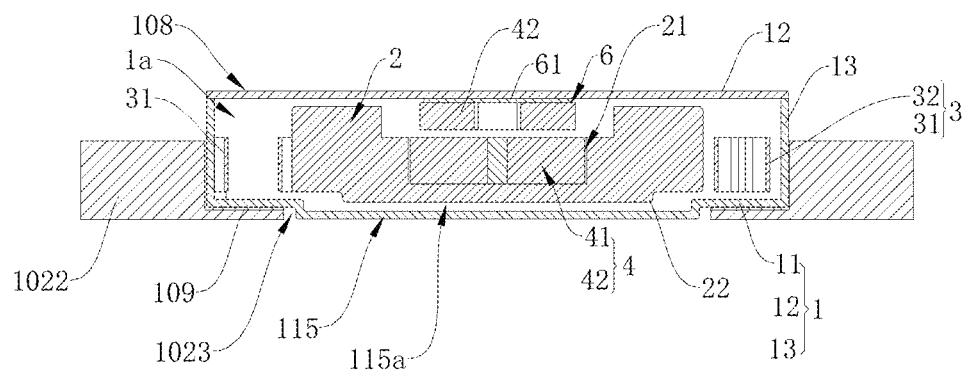
FIG. 21 is a schematic diagram of assembly of a vibration motor and a middle frame according to some still other embodiments of this application.

In some still other embodiments, referring to FIG. 21, FIG. 21 is a schematic diagram of assembly of the vibration motor 108 and the middle frame 102 according to some still other embodiments of this application. A difference between the vibration motor 108 in this embodiment and the vibration motor 108 shown in FIG. 20a lies in that, in the vibration motor 108 in this embodiment, the mass block 2 is provided with a second protruding portion 22, where only the second protruding portion 22 of the mass block 2 is accommodated in the first accommodating compartment 115a, and the damping structure 5 (not shown in FIG. 21) is disposed in a position other than the first accommodating compartment 115a. The damping structure 5 in this embodiment may be a magnetic liquid, a silica gel, a foam, or the like.

Therefore, volumes of structures such as the mass block 2 of the vibration motor 108 can be further increased without increasing the overall space occupied by the vibration motor 108, so that the overall performance of the vibration motor 108 can be improved without increasing the thickness of the terminal device 100. Moreover, while the volumes of the structures inside the vibration motor 108 are kept unchanged, that is, while the original performance of the vibration motor 108 is maintained, the mounting height of the vibration motor 108 can be reduced, so that the space occupied by the vibration motor 108 can be reduced, thereby thinning the terminal device 100.

It can be understood that, based on any one of the foregoing embodiments, on condition of ensuring that the magnet assembly 41 can cooperate with the coil 42 to drive the mass block 2 to reciprocatively vibrate along the direction A1 in the housing 1, structures of the magnet assembly 41 and the coil 42 may be alternatively designed into other structural forms.

Figure 22:
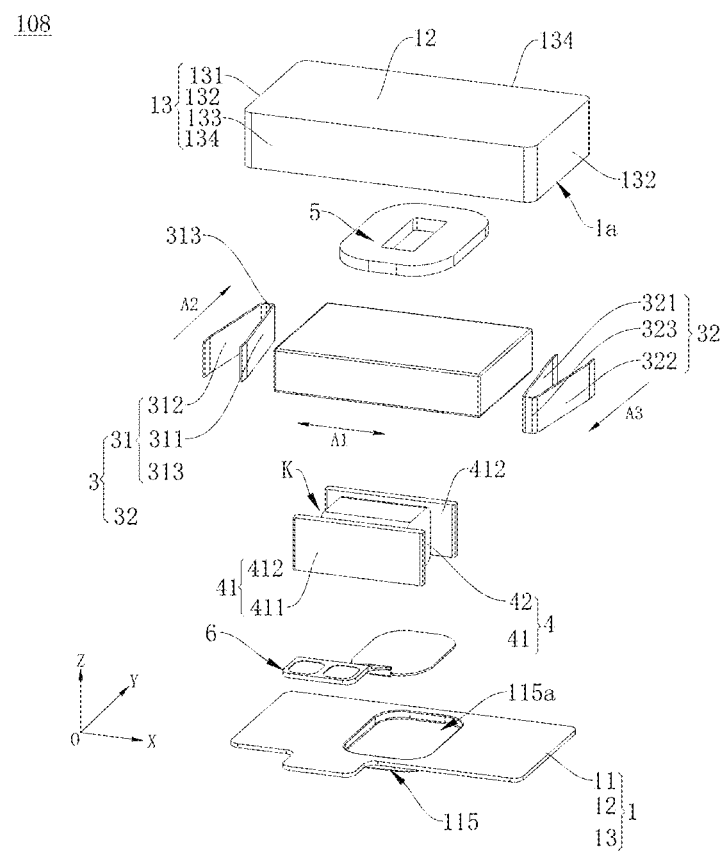
FIG. 22 is an exploded view of a vibration motor according to some still other embodiments of this application.
Figure 23:
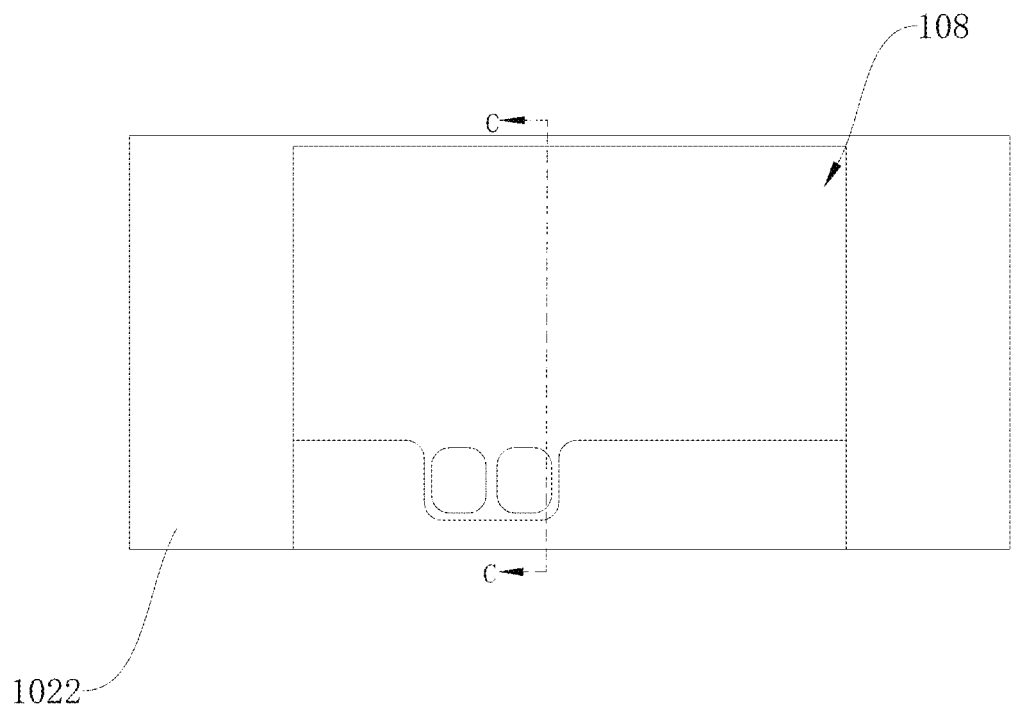
FIG. 23 is a top view of assembly of the vibration motor shown in FIG. 22 and a middle plate of a middle frame.
Figure 24:
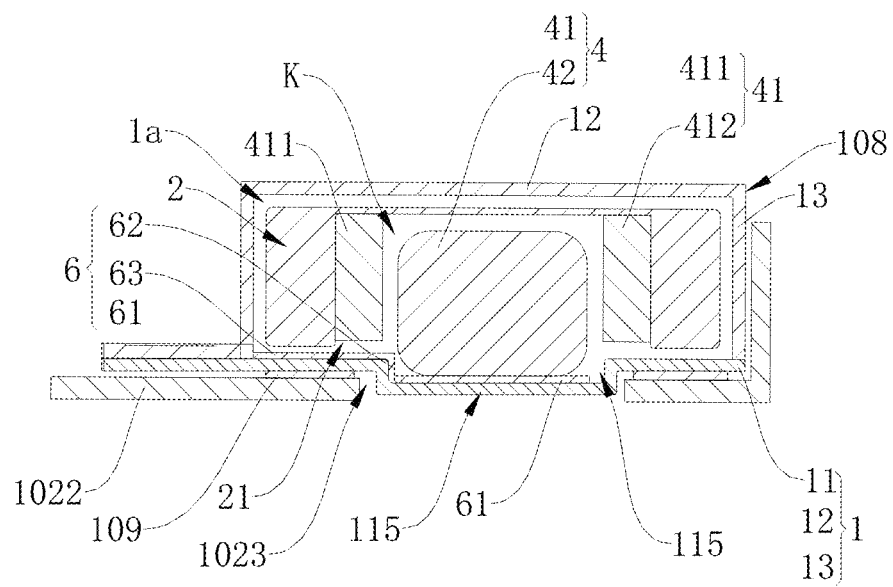
FIG. 24 is a sectional view along line C-C in FIG. 23.

For example, referring to FIG. 22 to FIG. 24, FIG. 22 is an exploded view of the vibration motor 108 according to some still other embodiments of this application, FIG. 23 is atop view of assembly of the vibration motor 108 shown in FIG. 22 and the middle plate 1022 of the middle frame 102, and FIG. 24 is a sectional view along line C-C in FIG. 23. A structure of the driving assembly 4 of the vibration motor 108 in this embodiment is different from that of the driving assembly 4 of the vibration motor 108 shown in FIG. 13. The magnet assembly 41 and the coil 42 of the driving assembly 4 shown in FIG. 13 are disposed at an interval in the height direction of the housing 1, whereas the magnet assembly 41 and the coil 42 in this embodiment are arranged in a direction parallel to the first wall plate 11. Specifically, referring to FIG. 22, the magnet assembly 41 and the coil 42 in this embodiment are arranged in the Y-axis direction. The magnet assembly 41 includes a first magnet 411 and a second magnet 412 that are spaced apart in the direction A2. A magnetic gap K (also referred to as "magnetic gap") is formed between the first magnet 411 and the second magnet 412. The coil 42 is disposed in the magnetic gap K. In this way, sizes of the coil 42 and the magnet assembly 41 in the height direction of the housing 1 can be set to comparatively large values.

Referring to FIG. 24, same as that in the vibration motor 108 in the embodiment shown in FIG. 13, the first segment 61 of the electrical connection structure 6 and part of the coil 42 are disposed in the first accommodating compartment 115a in this embodiment.

In another embodiment, based on an actual requirement, alternatively, only the first segment 61 of the electrical connection structure 6 may be disposed in the first accommodating compartment 115a; or the mass block 2 is provided with a second protruding portion 22, where the second protruding portion 22 is disposed in the first accommodating compartment 115a; or the damping structure 5 is disposed in the first accommodating compartment 115a; or the mass block 2 is provided with a second protruding portion 22, where the second protruding portion 22 and the damping structure 5 are both disposed in the first accommodating compartment 115a. In addition, part of the magnet assembly 41 may be disposed in the first accommodating compartment 115a.

Figure 25A:
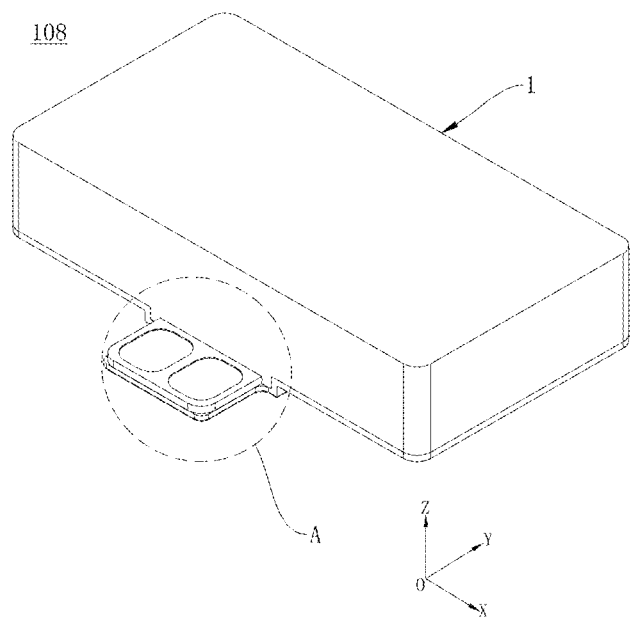
FIG. 25a is a stereogram of a vibration motor according to some other embodiments of this application.
Figure 25B:
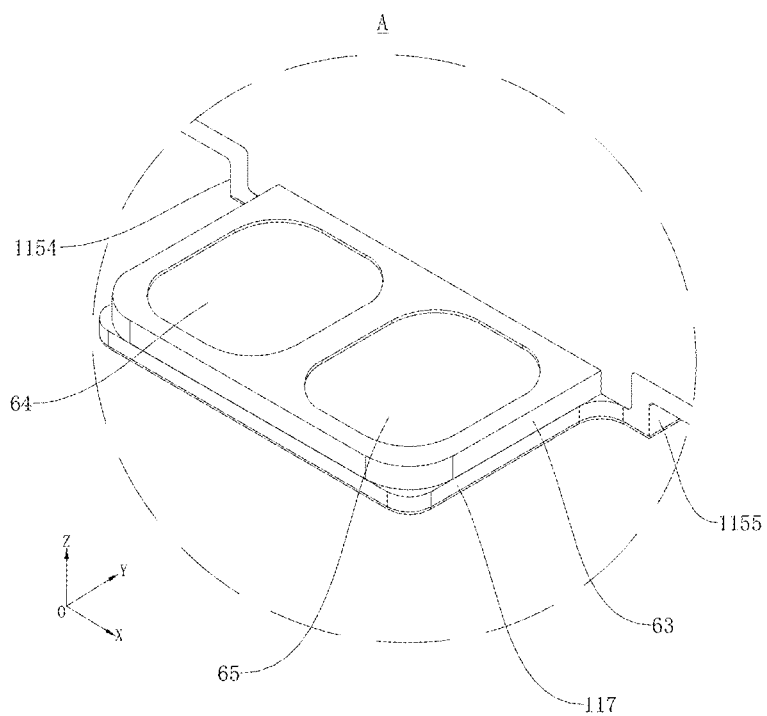
Figure 26:
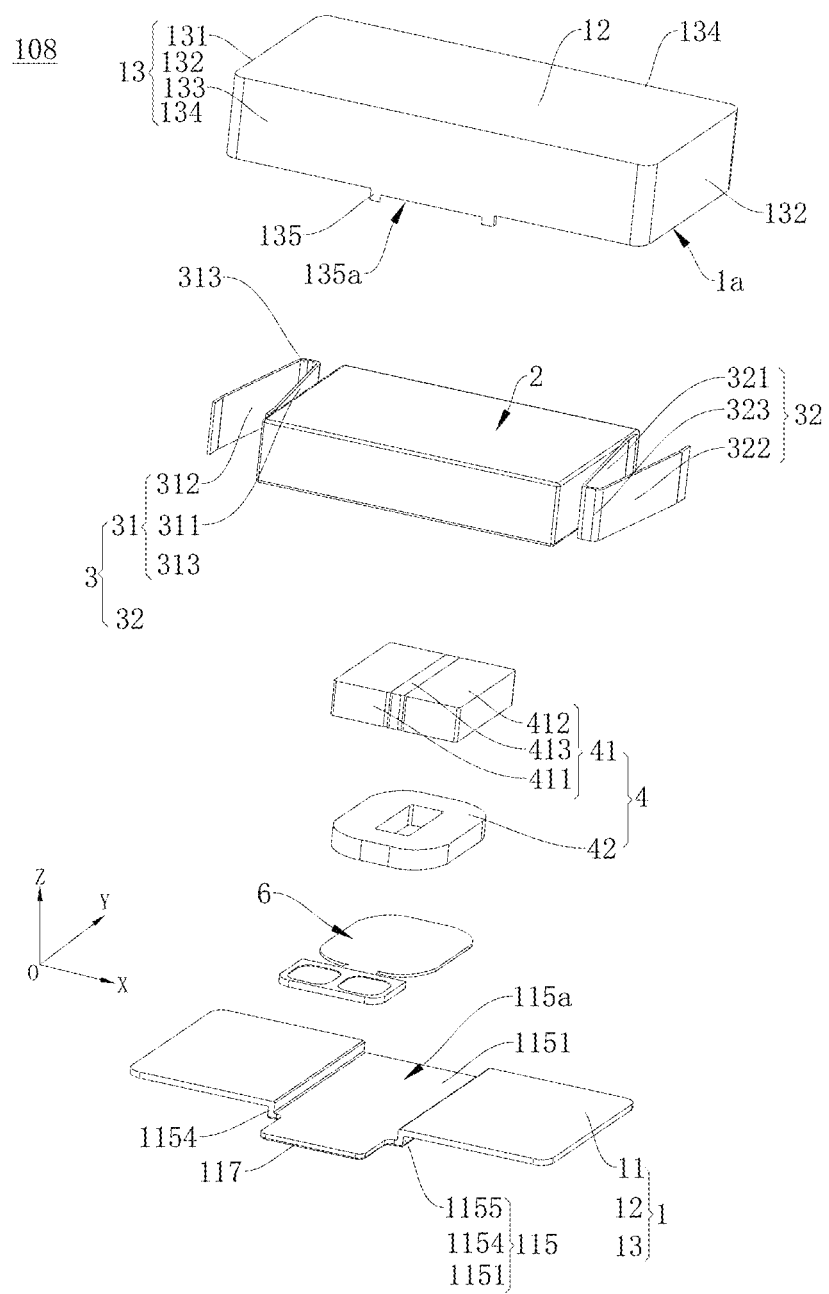

Based on any one of the foregoing embodiments, to increase space in the first accommodating compartment 115a and reduce processing difficulty of the vibration motor 108, referring to FIG. 25a to FIG. 26, FIG. 25a is a stereogram of the vibration motor 108 according to some other embodiments of this application, FIG. 25b is an enlarged view of a region A in FIG. 25a, and FIG. 26 is an exploded view of the vibration motor 108 shown in FIG. 25a. A difference between the vibration motor 108 in this embodiment and the vibration motor 108 shown in FIG. 6 lies in that a side wall of the first protruding portion 115 in the vibration motor 108 shown in FIG. 6 is in the shape of a ring, whereas a side wall of the first protruding portion 115 in this embodiment includes a first side wall 1154 and a second side wall 1155 that are opposite each other. Specifically, the first side wall 1154 and the second side wall 1155 are disposed opposite each other in the X-axis direction. Two ends of the first side wall 1154 in a length direction of the first side wall 1154 both extend to be level with the outer edge of the first wall plate 11. Two ends of the second side wall 1155 in a length direction of the second side wall 1155 both extend to be level with the outer edge of the first wall plate 11. In this way, a processing process of the first protruding portion 115 can be simplified, and accommodating space in the first accommodating compartment 115a can be increased. It can be understood that, in another embodiment, the first side wall 1154 and the second side wall 1155 may be alternatively disposed opposite each other in the Y-axis direction.

Optionally, a length of the first side wall 1154 is equal to a length of the first short side 111 of the first wall plate 11, and a length of the second side wall 1155 is equal to the length of the first short side 111 of the first wall plate 11.

Figure 27A:
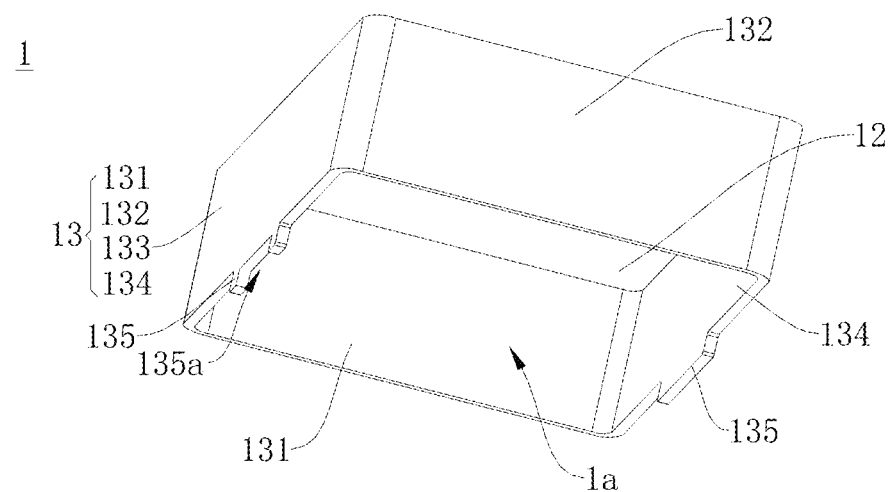
Figure 27A:
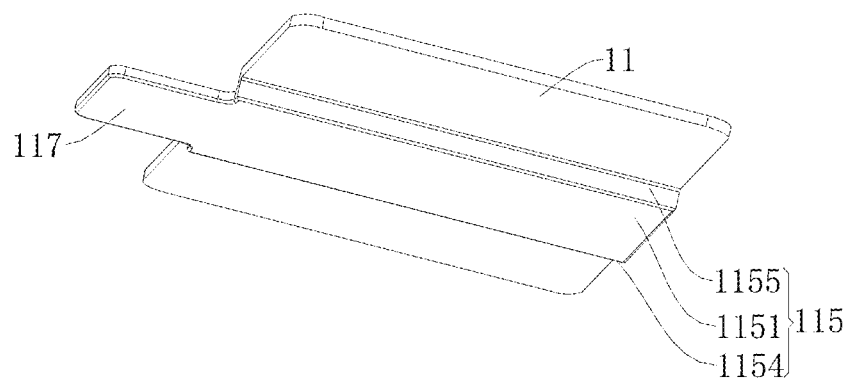

It can be understood that, as the two ends of the first side wall 1154 in the length direction of the first side wall 1154 both extend to be level with the outer edge of the first wall plate 11 and the two ends of the second side wall 1155 in the length direction of the second side wall 1155 both extend to be level with the outer edge of the first wall plate 11, referring to FIG. 27a, FIG. 27a is an exploded view of the housing 1 of the vibration motor 108 shown in FIG. 25a. Notches are formed at both ends of the first accommodating compartment 115a in a length direction of the first accommodating compartment 115a. To increase airtightness of the housing 1, blocking plates 135 are disposed on the side frame 13 in positions corresponding to the notches. The blocking plates 135 block the notches. On this basis, to avoid addition of heights of the third segment 63 of the electrical connection structure 6 and the housing 1, the blocking plate 135 is provided with an avoiding opening 135a, and the third segment 63 of the electrical connection structure 6 is disposed in the avoiding opening 135a in a passing-through manner.

Referring to FIG. 25a to FIG. 26, for ease of supporting and fixing the part of the third segment 63 of the electrical connection structure 6 located outside the housing 1, the supporting portion 117 may be disposed on the first top wall 1151 of the first protruding portion 115.

Figure 27B:
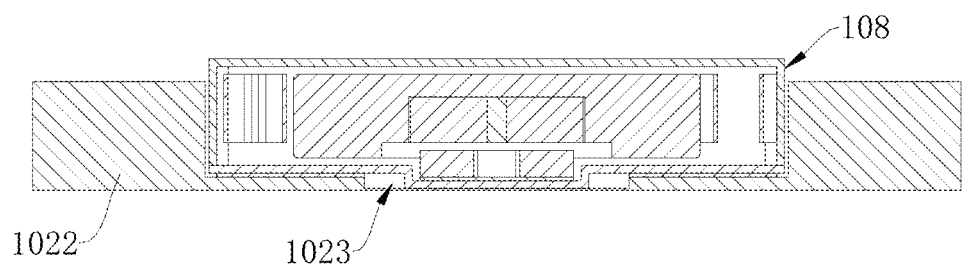
FIG. 27b is a schematic diagram of assembly of the vibration motor shown in FIG. 26 and a middle frame.

Based on the foregoing embodiment, referring to FIG. 27b, FIG. 27b is a schematic diagram of assembly of the vibration motor 108 shown in FIG. 26 and the middle frame 102. The first avoiding hole 1023 is a blind hole. In this way, airtightness of the middle frame 102 can be ensured, thereby increasing reliability of the terminal device 100.

Figure 27C:
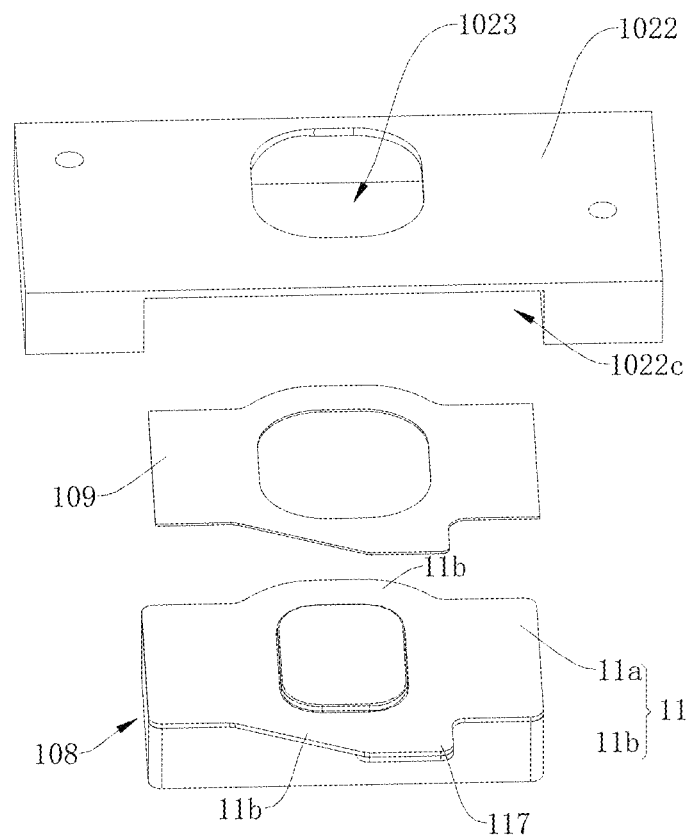
FIG. 27c is an exploded view of a vibration motor and a middle frame according to some other embodiments of this application.
Figure 27D:
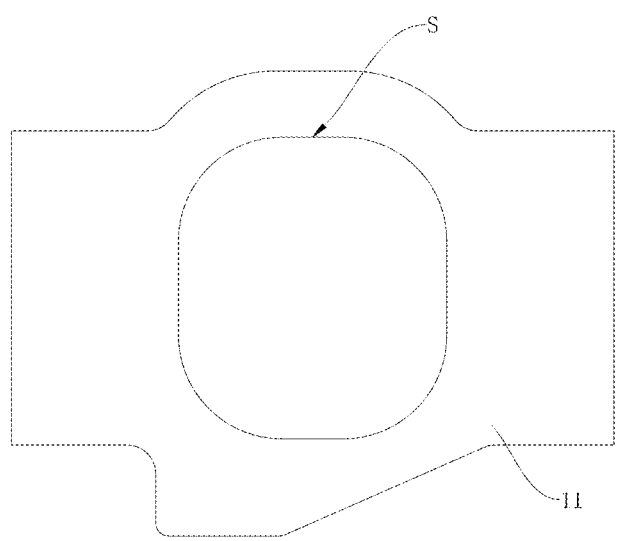
FIG. 27d is a schematic diagram of a position relationship between an outline of an orthographic projection of a first avoiding hole on a plane in which a first wall plate of the vibration motor shown in FIG. 27c is located and the first wall plate according to some embodiments of this application.

In some embodiments, when the first avoiding hole 1023 is formed as a through hole, to increase airtightness between the vibration motor 108 and the middle plate 1022 and ensure an effect between the vibration motor 108 and the middle plate 1022, referring to FIG. 27c and FIG. 27d, FIG. 27c is an exploded view of the vibration motor 108 and the middle frame 102 according to some other embodiments of this application.

A difference between the vibration motor 108 in this embodiment and the vibration motor 108 shown in FIG. 6 lies in that, in this embodiment, the first wall plate 11 of the vibration motor 108 includes a first wall plate body 11a and an extension plate 11b. The extension plate 11b is disposed on an outer edge of the first wall plate body 11a, and the extension plate 11b and the first wall plate body 11a are coplanar.

Referring to FIG. 27d, FIG. 27d is a schematic diagram of a position relationship between an outline of an orthographic projection of the first avoiding hole 1023 on the plane in which the first wall plate 11 of the vibration motor shown in FIG. 27c is located and the first wall plate 11. The orthographic projection of the first avoiding hole 1023 on the plane in which the first wall plate 11 is located is a second projection S. The outline of the second projection S is located on the inner side of the outer edge of the first wall plate 11, and the outline of the second projection S and the outer edge of the first wall plate 11 are spaced apart. The extension plate 11b may be in the shape of an arc, a polygon, or the like. In this way, as the first wall plate 11 is provided with the extension plate 11b, a contact area between the first wall plate 11 and the middle plate 1022 can be increased, so that a sealing part can be disposed between the first wall plate 11 and the middle plate 1022 to improve a sealing effect between the first wall plate 11 and the first avoiding hole 1023.

Optionally, the sealing part is the adhesive 109. In this way, the sealing effect between the first wall plate 11 and the first avoiding hole 1023 can be ensured, and furthermore, the first wall plate 11 can be fixedly connected to the middle plate 1022 via the adhesive 109, thereby simplifying the structure of the vibration motor 108.

Based on any one of the foregoing embodiments, to limit a position of the vibration motor 108 and prevent the vibration motor 108 from moving in the direction leaving the middle plate 1022, the terminal device 100 further includes the limiting structure 110. A limiting space C2 is limited between the limiting structure 110 and the middle plate 1022. The vibration motor 108 is disposed in the limiting space C2.

Figure 28:
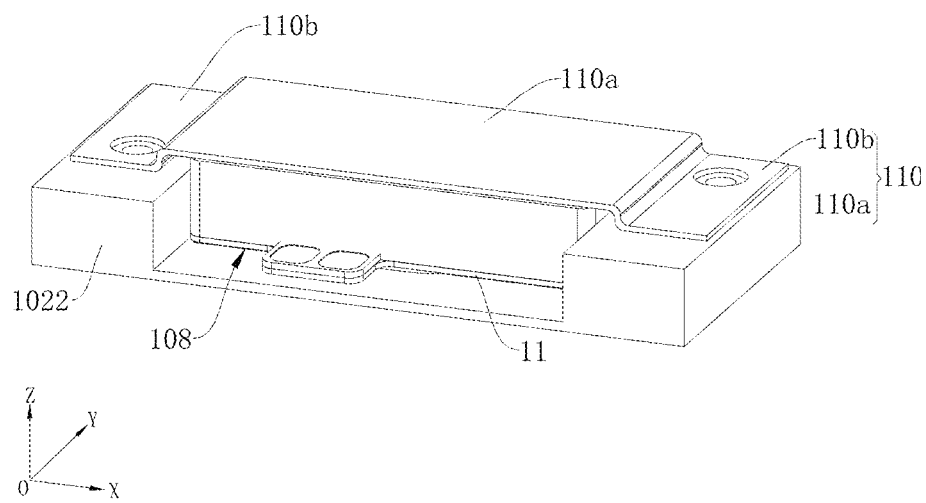
FIG. 28 is a stereogram of assembly of a limiting structure, a vibration motor, and a middle frame in a terminal device according to some embodiments of this application.

Referring to FIG. 28, FIG. 28 is a stereogram of assembly of the limiting structure 110, the vibration motor 108, and the middle frame 102 in the terminal device 100 according to some embodiments of this application. The limiting structure 110 includes a limiting portion 110a and a connection lug 110b. Specifically, the limiting portion 110a is opposite the second wall plate 12 of the vibration motor 108, the limiting portion 110a is in the shape of a long strip, and a length direction of the limiting portion 110a is parallel to the X-axis direction. The limiting portion 110a can limit the position of the vibration motor 108 and prevent the vibration motor 108 from moving in the direction leaving the middle plate 1022.

The connection lug 110b is fixedly connected to the limiting portion 110a. The limiting structure 110 is fixedly connected to the middle frame 102 via the connection lug 110b. Specifically, there may be one or more connection lugs 110b. The term "a plurality of" in this application means two or more. For example, referring to FIG. 28, there are two connection lugs 110b. The two connection lugs 110b are fixedly connected to two ends of the limiting portion 110a in a length direction of the limiting portion 110a, respectively. The limiting structure 110 is fixedly connected to the middle frame 102 via the two connection lugs 110b. For example, the connection lug 110b may be fixedly connected to the middle plate 1022 through screwing, adhesion, clamping, or the like. In this way, the limiting structure 110 can limit the position of the vibration motor 108 and prevent the vibration motor 108 from moving in a direction leaving the middle frame 102.

Optionally, the limiting portion 110a and the connection lug 110b are an integral structure. This can simplify a processing process of the limiting structure 110 and reduce processing costs.

In some embodiments, a material of the limiting structure 110 is metal, for example, stainless steel. In this way, the thickness of the limiting structure 110 can be designed to be comparatively small on condition that structural strength is ensured. This helps reduce space occupied by the limiting structure 110.

Figure 29:
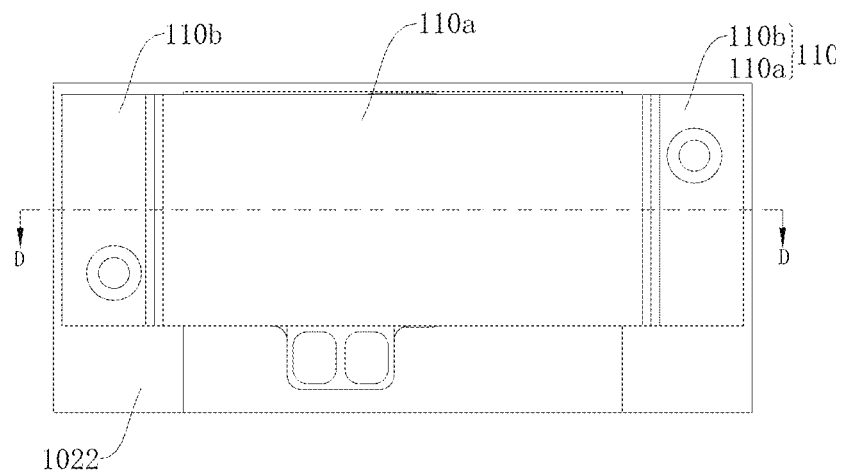
FIG. 29 is a top view of the vibration motor shown in FIG. 28.
Figure 30:
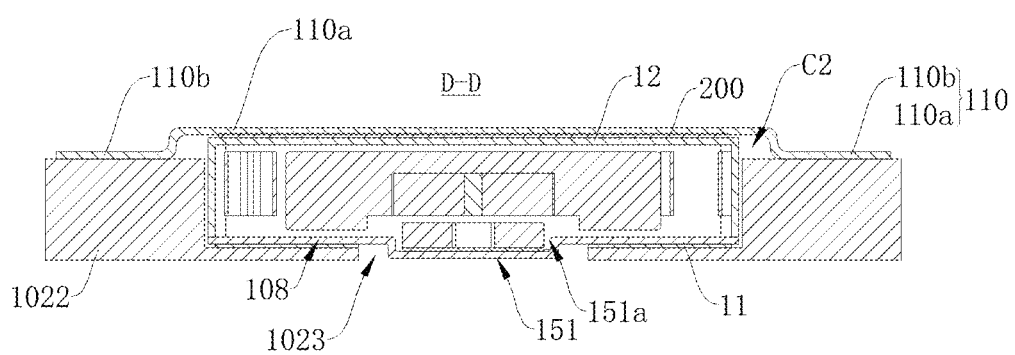
FIG. 30 is a sectional view along line D-D in FIG. 29.

Based on the foregoing embodiment, to avoid friction noise between the housing 1 of the vibration motor 108 and the limiting structure 110, referring to FIG. 29 and FIG. 30, FIG. 29 is a top view of the vibration motor 108 shown in FIG. 28, and FIG. 30 is a sectional view along line D-D in FIG. 29. A buffer part 200 is disposed between the vibration motor 108 and the limiting structure 110. Optionally, the buffer part 200 is a foam, a silica gel, or the like.

It can be understood that, in another embodiment, the limiting structure 110 may be alternatively another structure, provided that the structure can prevent the vibration motor 108 from moving in the direction leaving the middle plate 1022.

Figure 31:
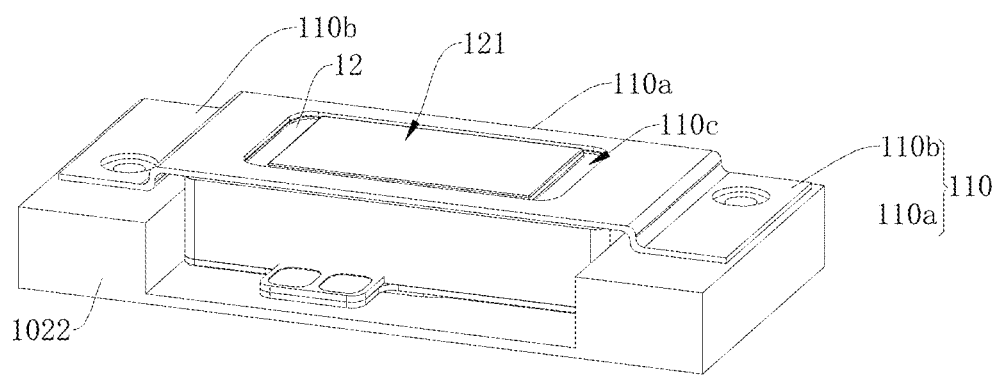
FIG. 31 is a stereogram of assembly of a vibration motor, a middle frame, and a limiting structure in a terminal device according to some other embodiments of this application.

On this basis, to further thin the terminal device 100 while ensuring vibration performance of the vibration motor 108 or further improve the overall performance of the vibration motor 108 without increasing the thickness of the terminal device 100, in some other embodiments, referring to FIG. 31, FIG. 31 is a stereogram of assembly of the vibration motor 108, the middle frame 102, and the limiting structure 110 in the terminal device 100 according to some other embodiments of this application. A difference between the terminal device 100 in this embodiment and the terminal device 100 shown in FIG. 28 lies in that, in the vibration motor 108 in this embodiment, not only the first wall plate 11 of the housing 1 is provided with the first protruding portion 115, but also the second wall plate 12 of the housing 1 is provided with a third protruding portion 121, and in addition, the limiting portion 110a of the limiting structure 110 is provided with a second avoiding hole 110c corresponding to the third protruding portion 121, so that the third protruding portion 121 is accommodated in the second avoiding hole 110c.

Figure 32:
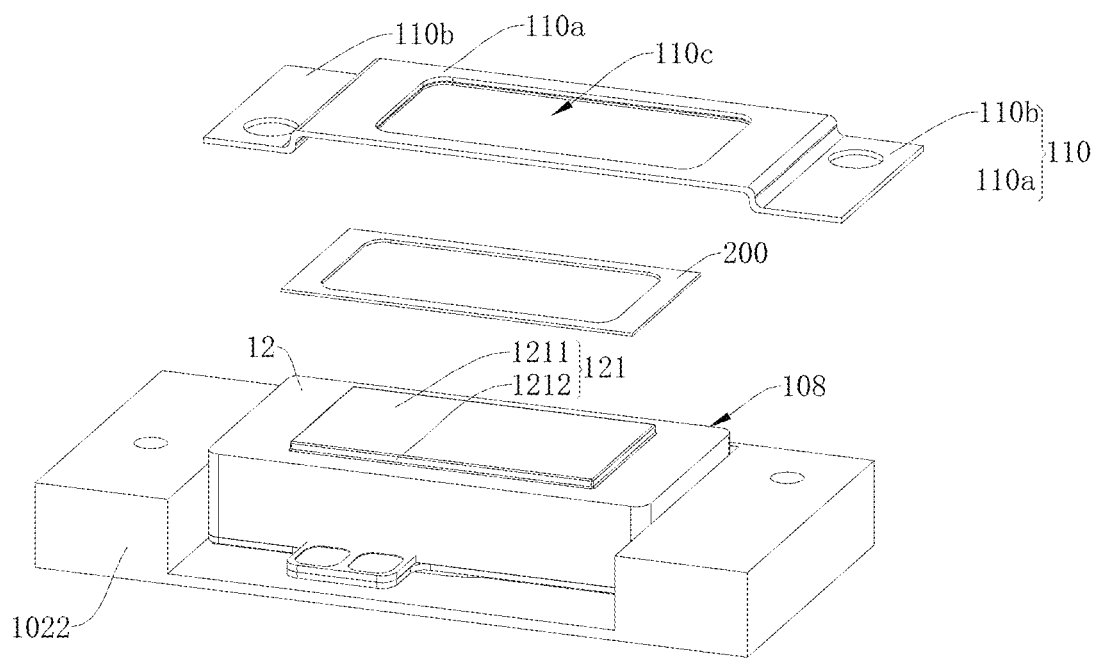
FIG. 32 is an exploded view of the vibration motor and the limiting structure in the stereogram of assembly shown in FIG. 31.
Figure 33:
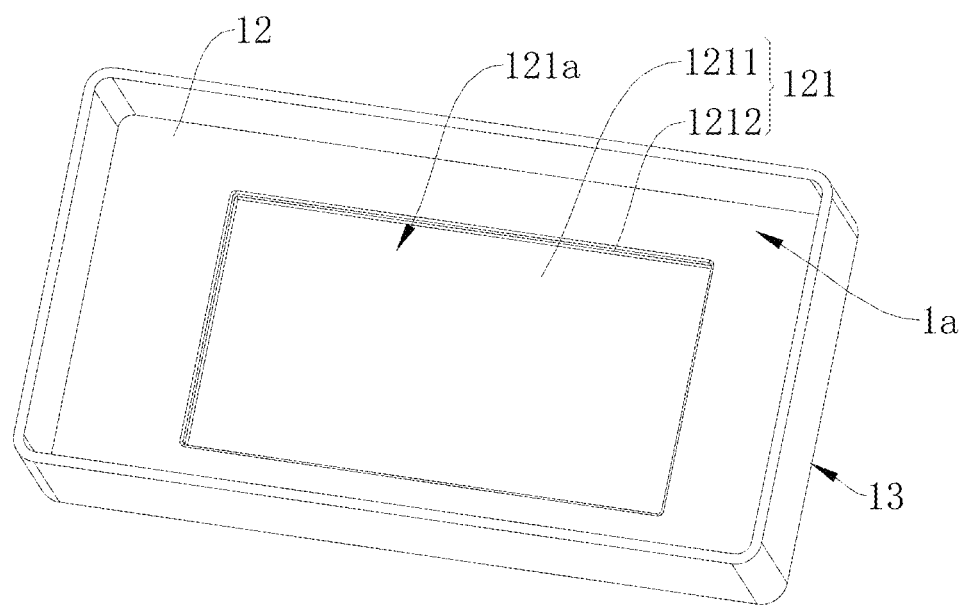
FIG. 33 is a stereogram of a side frame and a second wall plate of a housing in the vibration motor shown in FIG. 32, viewed from the inside to the outside.

Specifically, referring to FIG. 32 and FIG. 33, FIG. 32 is an exploded view of the vibration motor 108 and the limiting structure 110 in the stereogram of assembly shown in FIG. 31; and FIG. 33 is a stereogram of the side frame 13 and the second wall plate 12 of the housing 1 in the vibration motor 108 shown in FIG. 32, viewed from the inside to the outside. The second wall plate 12 is in the shape of a rectangular flat plate. The second wall plate 12 is opposite the first wall plate 11, and the second wall plate 12 is parallel to the first wall plate 11. The second wall plate 12 is provided with the third protruding portion 121 that protrudes in a direction leaving the accommodating space Ta. The third protruding portion 121 is hollow inside so that a second accommodating compartment 121a is formed. The second accommodating compartment 121a communicates with the accommodating space Ta. In this way, structures inside the vibration motor 108 can be accommodated in the second accommodating compartment 121a.

Referring to FIG. 32 and FIG. 33, the third protruding portion 121 includes a second top wall 1211 and a second encircling wall 1212. The second encircling wall 1212 is in the shape of a ring. The second encircling wall 1212 encircles an outer edge of the second top wall 1211. The second accommodating compartment 121a is limited between the second top wall 1211 and the second encircling wall 1212. Optionally, an outline of an orthographic projection of the second protruding portion 22 on the second wall plate 12 is in the shape of a circle, a rectangle, a rounded rectangle, a runway, an ellipse, or an irregular figure. A specific shape of the outline of the orthographic projection of the second protruding portion 22 on the second wall plate 12 may be adjusted and designed based on a shape of a specific component accommodated in the second accommodating compartment 121a. This is not specifically limited in this application.

Referring to FIG. 31 and FIG. 32, the second avoiding hole 110c is a through hole formed in the limiting portion 110a. In another embodiment, the second avoiding hole 110c may be alternatively a blind hole. On this basis, the buffer part 200 between the vibration motor 108 and the limiting structure 110 is in the shape of a ring.

In the embodiment, the first wall plate 11 is provided with the first protruding portion 115 that is hollow inside and the middle frame 102 is provided with the first avoiding hole 1023 corresponding to the first protruding portion 115, so that the first protruding portion 115 is accommodated in the first avoiding hole 1023; in addition, the second wall plate 12 is provided with the second protruding portion 22 that is hollow inside and the limiting structure 110 is provided with the second avoiding hole 110c corresponding to the second protruding portion 22, so that the second protruding portion 22 is accommodated in the second avoiding hole 110c. In this way, not only some of the structures in the vibration motor 108 can be disposed in the first accommodating compartment 115a in the first protruding portion 115, but also some of the structures in the vibration motor 108 can be disposed in the second accommodating compartment 121a in the second protruding portion 22. Hence, the terminal device 100 can be further thinned while the vibration performance of the vibration motor 108 is ensured. Moreover, the overall performance of the vibration motor 108 can be further improved without increasing the thickness of the terminal device 100.

The following describes layout of the structures inside the vibration motor 108 having the hollow first protruding portion 115 and the hollow second protruding portion 22.

Figure 34:
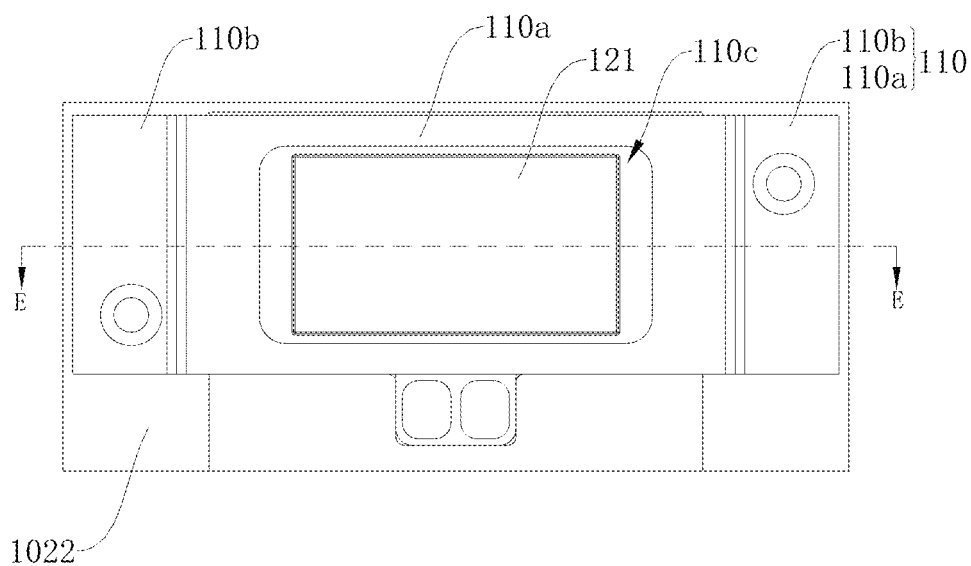
FIG. 34 is a top view of the stereogram of assembly shown in FIG. 31.
Figure 35:
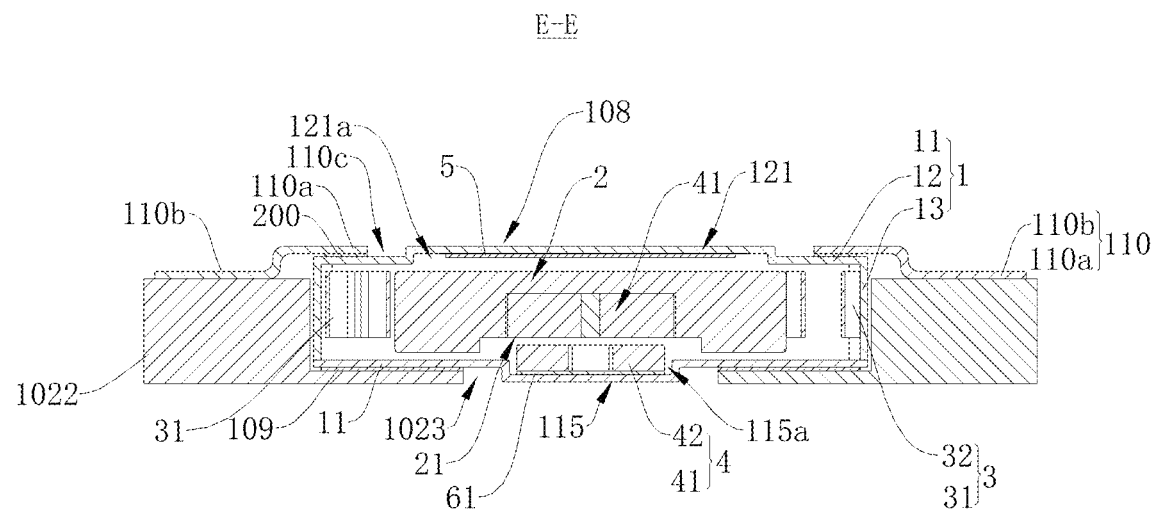
FIG. 35 is a sectional view along line E-E in FIG. 34.

Referring to FIG. 34 and FIG. 35, FIG. 34 is a top view of the stereogram of assembly shown in FIG. 31, and FIG. 35 is a sectional view along line E-E in FIG. 34. Structures of the mass block 2, the elastic assembly 3, the driving assembly 4, the damping structure 5, and the electrical connection structure 6 of the vibration motor 108 in this embodiment are the same as those of the mass block 2, the elastic assembly 3, the driving assembly 4, the damping structure 5, and the electrical connection structure 6 of the vibration motor 108 shown in FIG. 13.

In this embodiment, the first segment 61 of the electrical connection structure 6 and part of the coil 42 are disposed in the first accommodating compartment 115a, and the damping structure 5 is disposed in the second accommodating compartment 121a. Specifically, the damping structure 5 may be fixed to an inner surface of the second top wall 1211. Therefore, the volumes of the structures such as the mass block 2, the coil 42, and the magnet assembly 41 inside the vibration motor 108 can be increased without increasing the overall space occupied by the vibration motor 108, so that the overall performance of the vibration motor 108 can be improved without increasing the thickness of the terminal device 100. Moreover, while the volumes of the structures inside the vibration motor 108 are kept unchanged, that is, while the original performance of the vibration motor 108 is maintained, the mounting height of the vibration motor 108 can be reduced, so that the space occupied by the vibration motor 108 can be reduced, thereby thinning the terminal device 100.

Figure 36:
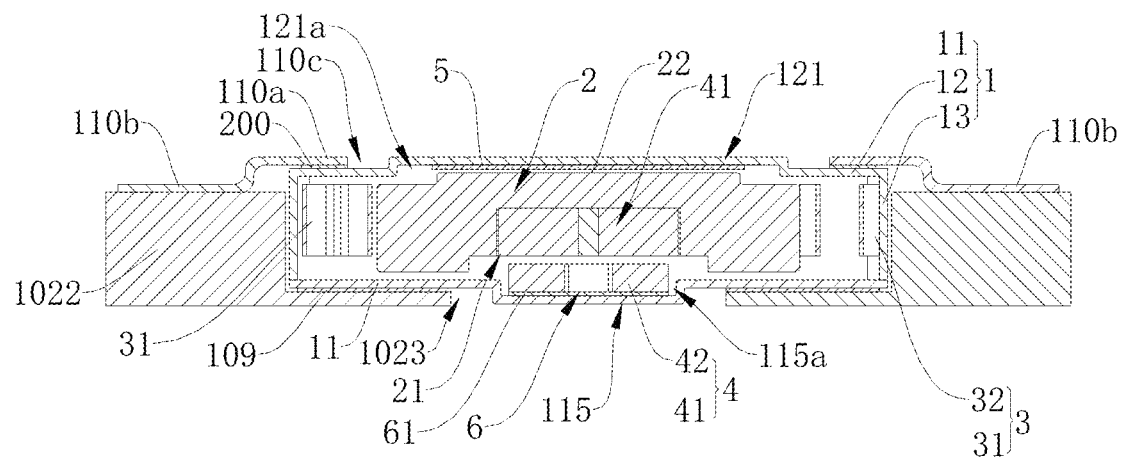
FIG. 36 is a schematic diagram of assembly of a limiting structure, a vibration motor, and a middle plate of a middle frame according to some still other embodiments of this application.

In some still other embodiments, referring to FIG. 36, FIG. 36 is a schematic diagram of assembly of the limiting structure 110, the vibration motor 108, and the middle plate 1022 of the middle frame 102 according to some still other embodiments of this application. A difference between this embodiment and the embodiment shown in FIG. 35 lies in that the mass block 2 in this embodiment is provided with a second protruding portion 22 that protrudes toward the limiting structure 110, where the damping structure 5 and the second protruding portion 22 are both accommodated in the second accommodating compartment 121a.

Based on the foregoing embodiment, to avoid interference between an outer encircling wall of the second protruding portion 22 and the second encircling wall 1212 of the third protruding portion 121 during motion of the mass block 2, the outer encircling wall of the second protruding portion 22 and the second encircling wall 1212 of the third protruding portion 121 need to be disposed at an interval, and a vibration stroke of the mass block 2 needs to be reserved.

Figure 37:
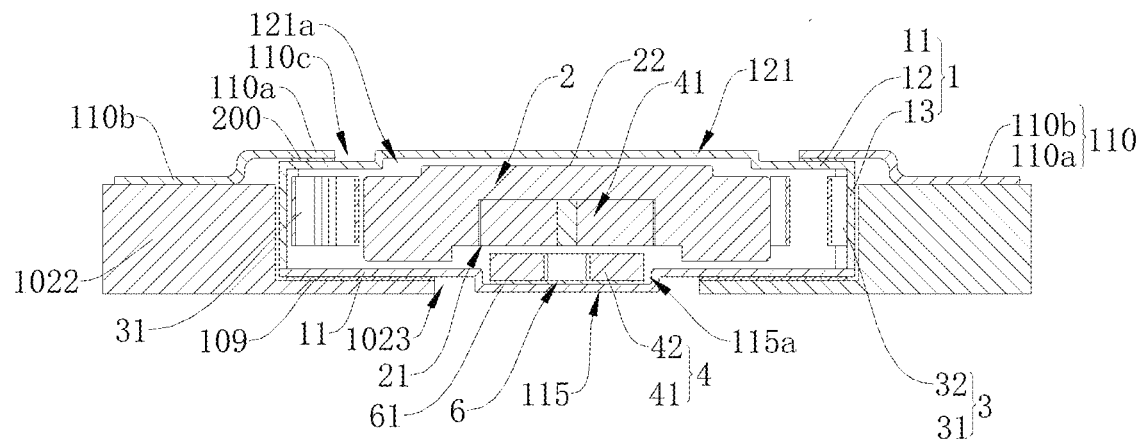
FIG. 37 is a schematic diagram of assembly of a limiting structure, a vibration motor, and a middle plate of a middle frame according to some still other embodiments of this application.

In some still other embodiments, referring to FIG. 37, FIG. 37 is a schematic diagram of assembly of the limiting structure 110, the vibration motor 108, and the middle plate 1022 of the middle frame 102 according to some still other embodiments of this application. A difference between the vibration motor 108 in this embodiment and the vibration motor 108 shown in FIG. 36 lies in that, in this embodiment, only the second protruding portion 22 of the mass block 2 is accommodated in the second accommodating compartment 121a, and the damping structure 5 (not shown in FIG. 37) is disposed in a position other than the second accommodating compartment 121a. The damping structure 5 in this embodiment may be a magnetic liquid, a silica gel, a foam, or the like.

Figure 38A:
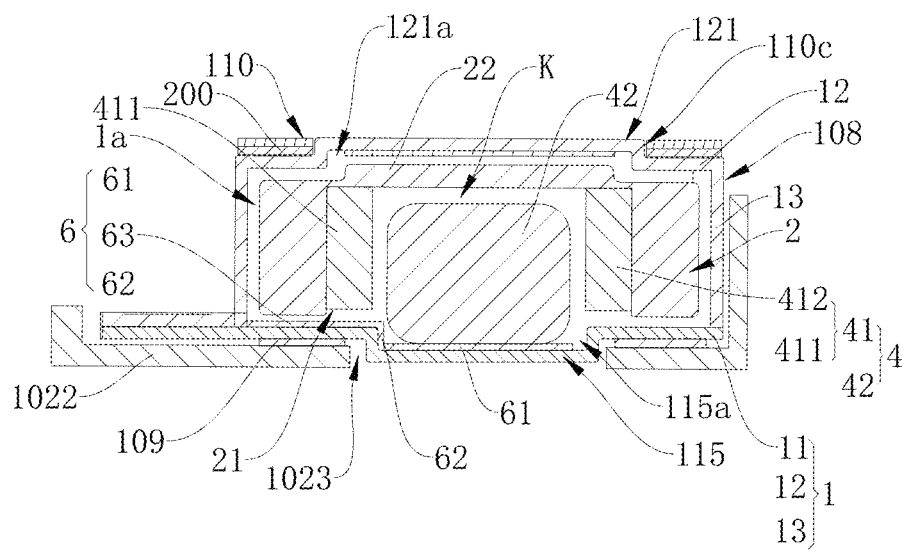
FIG. 38a is a schematic diagram of assembly of a limiting structure, a vibration motor, and a middle plate of a middle frame according to some still other embodiments of this application.

In some still other embodiments, referring to FIG. 38a, FIG. 38a is a schematic diagram of assembly of the limiting structure 110, the vibration motor 108, and the middle plate 1022 of the middle frame 102 according to some still other embodiments of this application. Same as those of the vibration motor 108 in the embodiment shown in FIG. 24, the magnet assembly 41 and the coil 42 of the vibration motor 108 in this embodiment are arranged in a direction parallel to the first wall plate 11. On this basis, in this embodiment, the first segment 61 of the electrical connection structure 6 and the coil 42 may be disposed in the first accommodating compartment 115a, and the mass block 2 is provided with a second protruding portion 22, where the second protruding portion 22 and the damping structure 5 are accommodated in the second accommodating compartment 121a.

Certainly, in another embodiment, alternatively, the first segment 61 of the electrical connection structure 6 and the coil 42 may be disposed in the first accommodating compartment 115a, and only the damping structure 5 or the second protruding portion 22 is accommodated in the second accommodating compartment 121a.

Figure 38B:
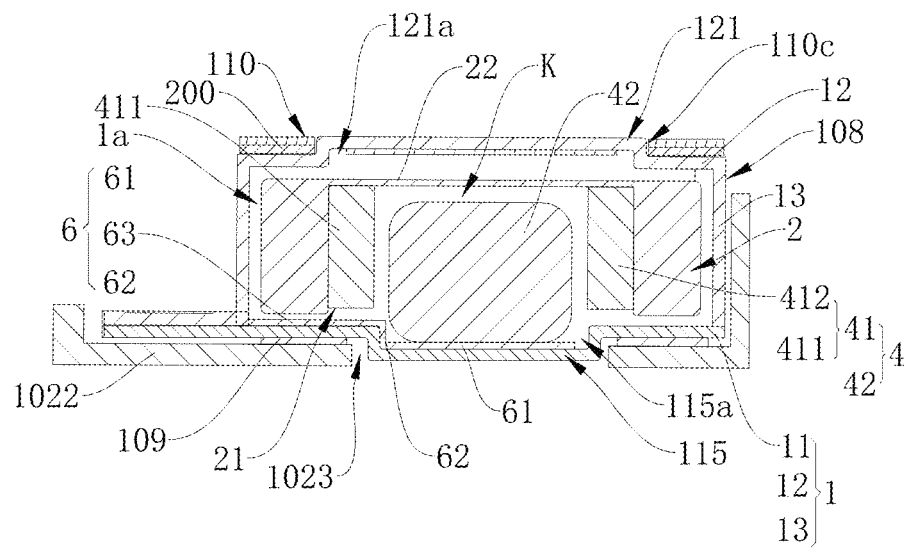
FIG. 38b is a schematic diagram of assembly of a limiting structure, a vibration motor, and a middle plate of a middle frame according to some still other embodiments of this application.

For example, referring to FIG. 38b, FIG. 38b is a schematic diagram of assembly of the limiting structure 110, the vibration motor 108, and the middle plate 1022 of the middle frame 102 according to some still other embodiments of this application. In the embodiments, the first segment 61 of the electrical connection structure 6 and the coil 42 are disposed in the first accommodating compartment 115a, and only the damping structure 5 is accommodated in the second accommodating compartment 121a.

Figure 38C:
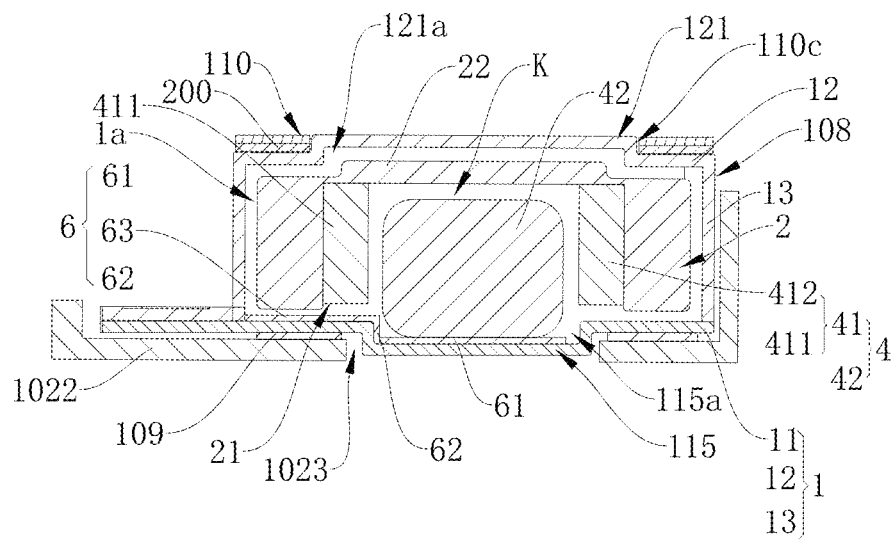
FIG. 38c is a schematic diagram of assembly of a limiting structure, a vibration motor, and a middle plate of a middle frame according to some still other embodiments of this application.

For another example, referring to FIG. 38c, FIG. 38c is a schematic diagram of assembly of the limiting structure 110, the vibration motor 108, and the middle plate 1022 of the middle frame 102 according to some still other embodiments of this application. In the embodiments, the first segment 61 of the electrical connection structure 6 and the coil 42 are disposed in the first accommodating compartment 115a, and the second protruding portion 22 is accommodated in the second accommodating compartment 121a.

Figure 39A:
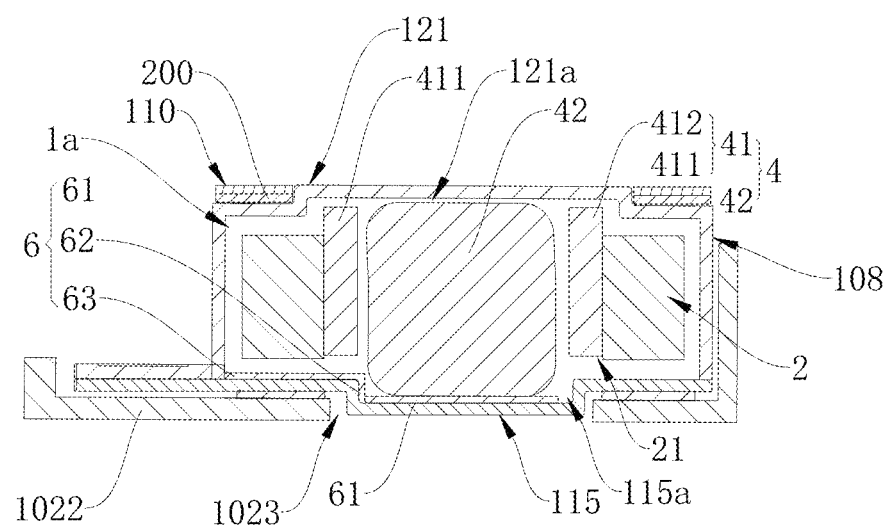
FIG. 39a is a schematic diagram of assembly of a limiting structure, a vibration motor, and a middle plate of a middle frame according to some still other embodiments of this application.
Figure 39B:
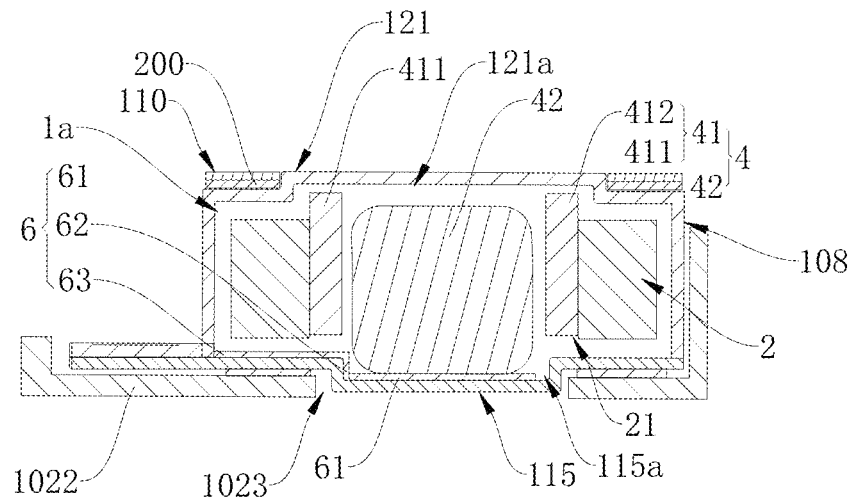
FIG. 39b is a schematic diagram of assembly of a limiting structure, a vibration motor, and a middle plate of a middle frame according to some still other embodiments of this application.
Figure 39C:
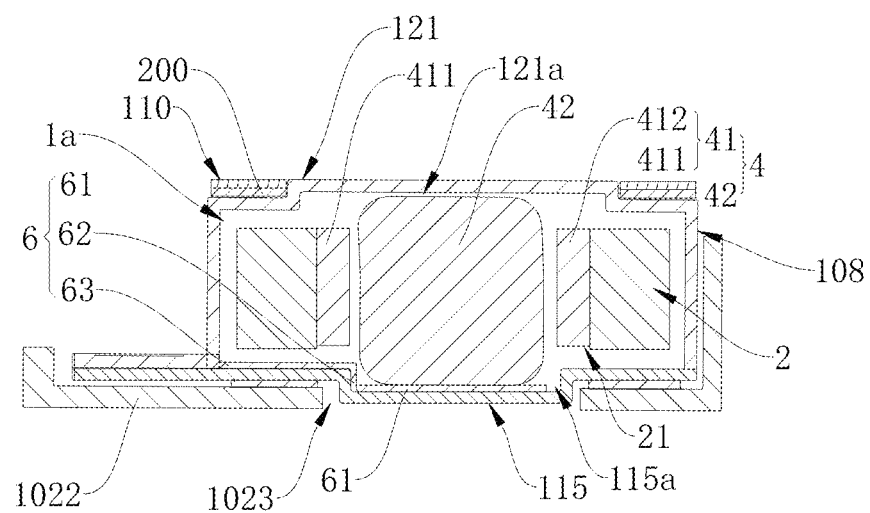
FIG. 39c is a schematic diagram of assembly of a limiting structure, a vibration motor, and a middle plate of a middle frame according to some still other embodiments of this application.

In addition, when the magnet assembly 41 and the coil 42 are arranged in the direction parallel to the first wall plate 11, referring to FIG. 39a, FIG. 39a is a schematic diagram of assembly of the limiting structure 110, the vibration motor 108, and the middle plate 1022 of the middle frame 102 according to some still other embodiments of this application. A difference between this embodiment and the terminal device 100 shown in FIG. 38b lies in that the mounting slot 21 in the mass block 2 in this embodiment forms a through slot whose two ends are open, the magnet assembly 41 is fixed in the mounting slot 21, and an end of the magnet assembly 41 farther away from the first wall plate 11 is accommodated in the second accommodating compartment 121a. Specifically, the end of the magnet assembly 41 farther away from the first wall plate 11 may pass through the mounting slot 21 and be accommodated in the second accommodating compartment 121a. An end of the coil 42 farther away from the first wall plate 11 is accommodated in the second accommodating compartment 121a. The end of the coil 42 farther away from the first wall plate 11 may pass through the mounting slot 21 and be accommodated in the second accommodating compartment 121a. Certainly, in another embodiment, referring to FIG. 39b, alternatively, only the end of the magnet assembly 41 farther away from the first wall plate 11 may be accommodated in the second accommodating compartment 121a, and the end of the coil 42 farther away from the first wall plate 11 is not accommodated in the second accommodating compartment 121a. Alternatively, referring to FIG. 39c, only the end of the coil 42 farther away from the first wall plate 11 may be accommodated in the second accommodating compartment 121a, and the end of the magnet assembly 41 farther away from the first wall plate 11 is not accommodated in the second accommodating compartment 121a.

It can be understood that, in any one of the foregoing embodiments, a component disposed in the first accommodating compartment 115a and a component disposed in the second accommodating compartment 121a are interchangeable.

In another embodiment, alternatively, only the second wall plate 12 may be provided with a third protruding portion 121 whereas the first wall plate 11 is provided with no first protruding portion 115, and the limiting structure 110 is provided with a second avoiding hole 110c corresponding to the third protruding portion 121, so that the third protruding portion 121 is accommodated in the second avoiding hole 110c. In this way, the volumes of the structures such as the mass block 2, the coil 42, and the magnet assembly 41 inside the vibration motor 108 can also be increased without increasing the overall space occupied by the vibration motor 108, so that the overall performance of the vibration motor 108 can be improved without increasing the thickness of the terminal device 100. Moreover, while the volumes of the structures inside the vibration motor 108 are kept unchanged, that is, while the original performance of the vibration motor 108 is maintained, the mounting height of the vibration motor 108 can be reduced, so that the space occupied by the vibration motor 108 can be reduced, thereby thinning the terminal device 100.

The following describes layout of the structures inside the vibration motor 108 in which only the second wall plate 12 is provided with the third protruding portion 121 whereas the first wall plate 11 is provided with no first protruding portion 115.

Figure 40:
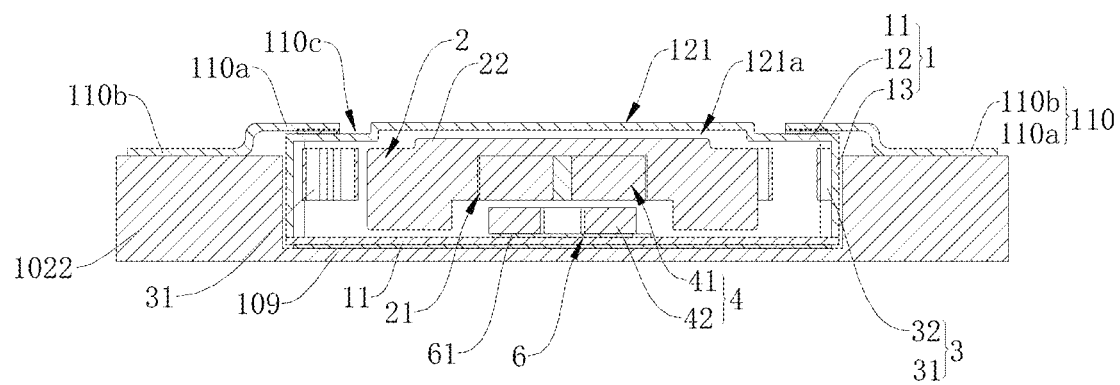
FIG. 40 is a schematic diagram of assembly of a limiting structure, a vibration motor, and a middle plate of a middle frame according to some still other embodiments of this application.

Referring to FIG. 40, FIG. 40 is a schematic diagram of assembly of the limiting structure 110, the vibration motor 108, and the middle frame 102 according to some still other embodiments of this application. Structures of the mass block 2, the elastic assembly 3, the driving assembly 4, the damping structure 5, and the electrical connection structure 6 of the vibration motor 108 in this embodiment are the same as those of the mass block 2, the elastic assembly 3, the driving assembly 4, the damping structure 5, and the electrical connection structure 6 of the vibration motor 108 shown in FIG. 35. A difference between the vibration motor 108 in this embodiment and the vibration motor 108 in the embodiment shown in FIG. 35 lies in that, in the vibration motor 108 in this embodiment, because only the second wall plate 12 is provided with the hollow third protruding portion 121 whereas the first wall plate 11 is provided with no first protruding portion 115, during assembly, the damping structure 5 is disposed in the second accommodating compartment 121a in the second protruding portion 22 and the electrical connection structure 6 is directly fixedly connected to the inner surface of the first wall plate 11. Specifically, in this embodiment, the first segment 61 and the second segment 62 of the electrical connection structure 6 are located in a same plane, and the first segment 61 and the second segment 62 of the electrical connection structure 6 are both fixed to the inner surface of the first wall plate 11.

Figure 41:
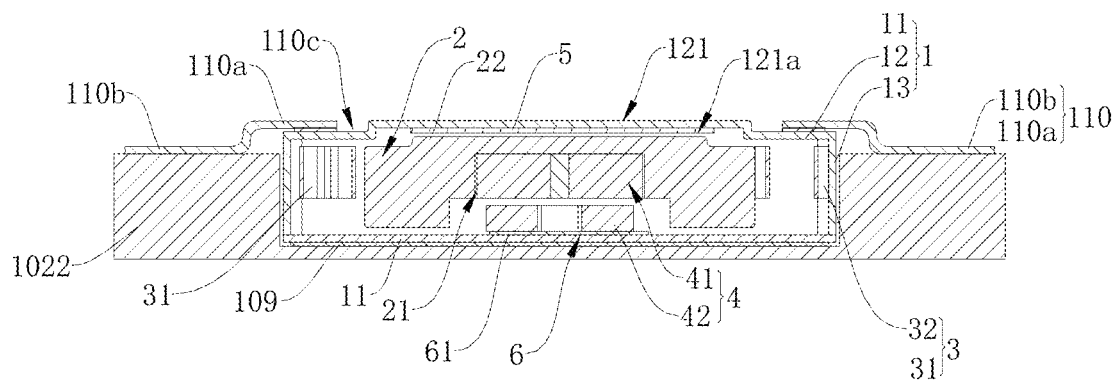
FIG. 41 is a schematic diagram of assembly of a limiting structure, a vibration motor, and a middle plate of a middle frame according to some still other embodiments of this application.

Referring to FIG. 41, FIG. 41 is a schematic diagram of assembly of the limiting structure 110, the vibration motor 108, and the middle frame 102 according to some still other embodiments of this application. A difference between the terminal device 100 in this embodiment and the terminal device 100 in FIG. 40 lies in that, in this embodiment, the damping structure 5 is disposed in the second accommodating compartment 121a, and the mass block 2 is further provided with a second protruding portion 22, where the second protruding portion 22 is accommodated in the second accommodating compartment 121a.

Figure 42:
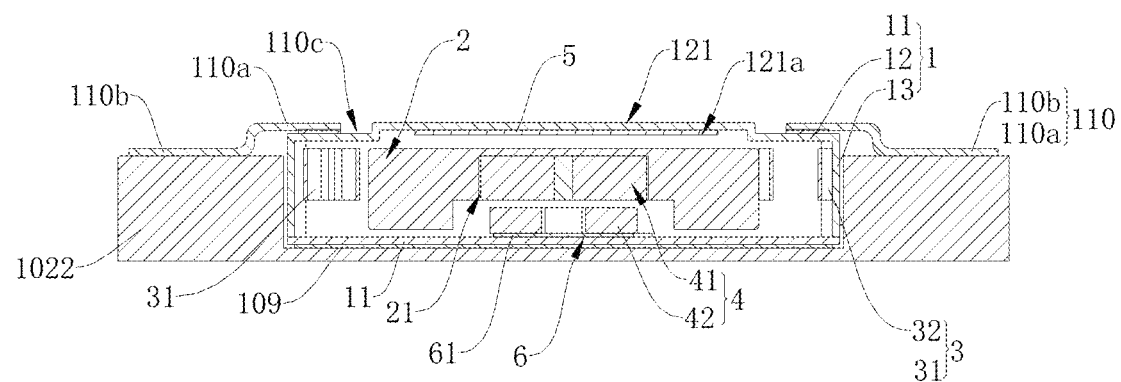
FIG. 42 is a schematic diagram of assembly of a limiting structure, a vibration motor, and a middle plate of a middle frame according to some still other embodiments of this application.

On this basis, referring to FIG. 42, FIG. 42 is a schematic diagram of assembly of the limiting structure 110, the vibration motor 108, and the middle frame 102 according to some still other embodiments of this application. In this case, alternatively, only the second protruding portion 22 of the mass block 2 may be accommodated in the second accommodating compartment 121a, and the damping structure 5 (not shown in FIG. 42) is disposed in a position other than the second accommodating compartment 121a.

It can be understood that, when the magnet assembly 41 and the coil 42 are arranged in the direction parallel to the first wall plate 11, alternatively, the damping structure 5 and/or the second protruding portion 22 may be disposed in the second accommodating compartment 121a. In addition, when the magnet assembly 41 and the coil 42 are arranged in the direction parallel to the first wall plate 11, the magnet assembly 41 and the coil 42 may also be disposed in the second accommodating compartment 121a.

Figure 43:
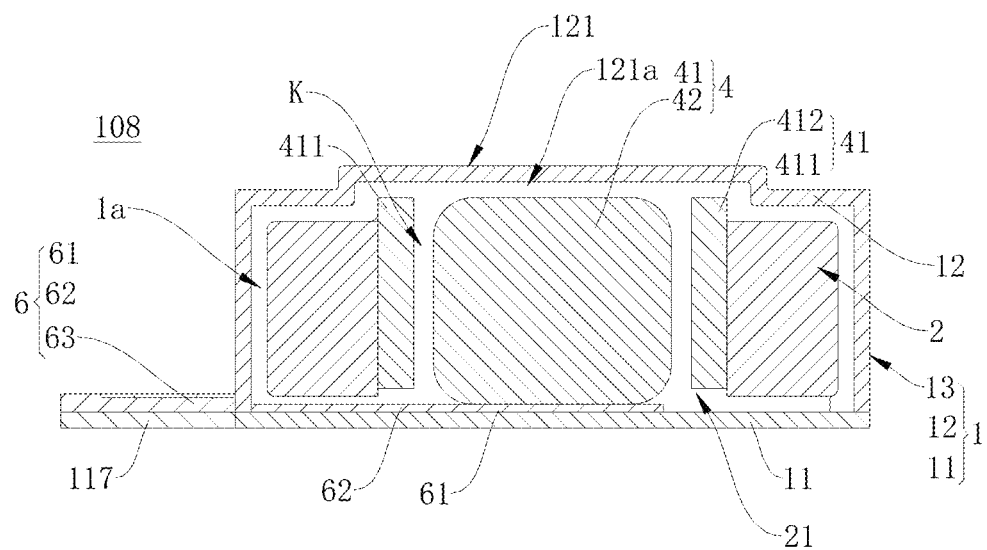
FIG. 43 is a schematic diagram of assembly of a limiting structure, a vibration motor, and a middle plate of a middle frame according to some still other embodiments of this application.

Referring to FIG. 43, FIG. 43 is a sectional view of the vibration motor 108 according to some still other embodiments of this application. The magnet assembly 41 and the coil 42 in this embodiment are arranged in the direction parallel to the first wall plate 11, and the through mounting slot 21 is formed in the mass block 2 in this embodiment, that is, both ends of the mounting slot 21 are open. An end of the magnet assembly 41 closer to the second wall plate 12 passes through the mounting slot 21 and is accommodated in the second accommodating compartment 121a. An end of the coil 42 closer to the second wall plate 12 passes through the mounting slot 21 and is accommodated in the second accommodating compartment 121a.

Certainly, in another embodiment, alternatively, only the end of the coil 42 closer to the second wall plate 12 may pass through the mounting slot 21 and be accommodated in the second accommodating compartment 121a.

Figure 44:
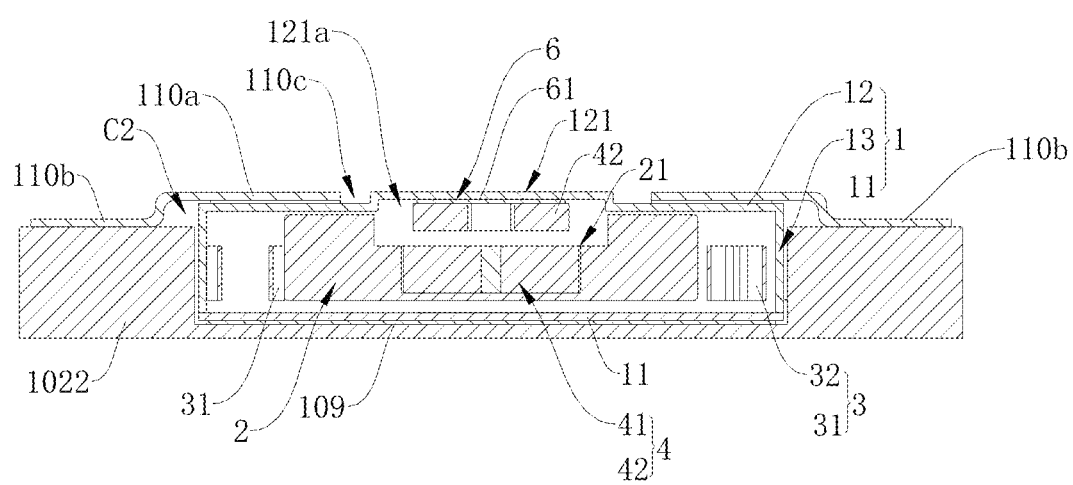
FIG. 44 is a schematic diagram of assembly of a limiting structure, a vibration motor, and a middle plate of a middle frame according to some still other embodiments of this application.

Referring to FIG. 44, FIG. 44 is a sectional view of the vibration motor 108 according to some still other embodiments of this application. A difference between the vibration motor 108 in this embodiment and the vibration motor 108 shown in FIG. 40 lies in that, in the vibration motor 108 in this embodiment, the first segment 61 of the electrical connection structure 6 and the coil 42 are disposed in the second accommodating compartment 121a. On this basis, to increase sensitivity of cooperation between the coil 42 and the magnet assembly 41, the mass block 2 in this embodiment may be rotated by 180° relative to the mass block 2 in the vibration motor 108 shown in FIG. 40.

The specific features, structures, materials, or characteristics described in this specification may be combined in a suitable manner in any one or more embodiments or examples.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A vibration motor, used for a terminal device, wherein the terminal device is provided with a middle frame having a first avoiding hole; wherein the vibration motor comprises a housing with a first wall plate;
wherein an accommodating space is formed in the housing, the first wall plate is provided with a first protruding portion that protrudes outwards, the first protruding portion is hollow inside to form a first accommodating compartment is formed, and the first accommodating compartment communicates with the accommodating space; and
wherein when the vibration motor is mounted on the middle frame, an outer surface of the first wall plate faces the middle frame, and the first protruding portion is accommodated in the first avoiding hole.

2. The vibration motor of claim 1, wherein the vibration motor further comprising: a mass block, wherein the mass block is configured to reciprocatively vibrate relative to the housing in a plane paralleling to a plane in which the first wall plate is located;
a driving assembly, wherein the driving assembly is configured to drive the mass block to reciprocatively vibrate relative to the housing in the plane paralleling to the plane in which the first wall plate is located; and
a damping structure, wherein the damping structure is configured to provide damping force for the mass block so that the mass block stops vibrating.

3. The vibration motor of claim 2, wherein the driving assembly comprises a magnet assembly and a coil; wherein the magnet assembly is fixed to the mass block, the coil and the magnet assembly cooperate to drive the mass block, and at least part of the coil is located in the first accommodating compartment.

4. The vibration motor of claim 3, wherein the vibration motor further comprises an electrical connection structure; and
wherein the electrical connection structure comprises a first segment, a second segment, and a third segment that are sequentially connected; wherein the first segment is fixed to a compartment bottom wall of the first accommodating compartment, and the coil is fixed to the first segment and electrically connected to the first segment; the second segment is fixed to an inner side wall of the first accommodating compartment; and part of the third segment is located outside the housing, wherein the part of the third segment located outside the housing is provided with a positive terminal and a negative terminal.

5. The vibration motor of claim 2, wherein the housing comprises a second wall plate disposed opposite the first wall plate; and
wherein the driving assembly comprises a magnet assembly and a coil, wherein the magnet assembly is fixed to the mass block, the coil and the magnet assembly cooperate to drive the mass block, and the coil is fixedly connected to the second wall plate.

6. The vibration motor of claim 5, wherein the damping structure is located in the first accommodating compartment, and the mass block is provided with a second protruding portion; wherein the second protruding portion is accommodated in the first accommodating compartment.

7. The vibration motor of claim 5, wherein the mass block is provided with a through mounting slot, the magnet assembly is fixed in the mounting slot, and an end of the magnet assembly farther away from the second wall plate is accommodated in the first accommodating compartment.

8. The vibration motor of claim 7, wherein the magnet assembly has a magnetic gap, the coil is located in the magnetic gap, and an end of the coil farther away from the second wall plate is accommodated in the first accommodating compartment.

9. The vibration motor of claim 1, wherein the first protruding portion comprises a first top wall and a first encircling wall;
wherein the first encircling wall encircles an outer edge of the first top wall, an end of the first encircling wall farther away from the first top wall is fixedly connected to the first wall plate, an orthographic projection of the first protruding portion on the plane in which the first wall plate is located is a first projection, and an outline of the first projection is located on an inner side of an outer edge of the first wall plate.

10. The vibration motor of claim 1, wherein the first protruding portion comprises a first top wall, a first side wall, and a second side wall;
wherein the first side wall is disposed opposite the second side wall, the first side wall and the second side wall are both located between the first top wall and the first wall plate, two ends of the first side wall in a length direction of the first side wall both extend to be level with an outer edge of the first wall plate, and two ends of the second side wall in a length direction of the second side wall both extend to be level with the outer edge of the first wall plate.

11. The vibration motor of claim 9, wherein the first wall plate comprises a first wall plate body and an extension plate;
wherein the extension plate is disposed on an outer edge of the first wall plate body, and the extension plate and the first wall plate body are coplanar; wherein and an orthographic projection of the first avoiding hole on the plane in which the first wall plate is located is a second projection; and wherein an outline of the second projection is located on the inner side of the outer edge of the first wall plate, and the outline of the second projection and the outer edge of the first wall plate are spaced apart.

12. The vibration motor of claim 1, wherein the terminal device is provided with a limiting structure fixed to the middle frame, and the limiting structure is provided with a second avoiding hole; and
wherein the housing comprises a second wall plate; wherein the second wall plate is opposite the first wall plate, and the second wall plate is provided with a third protruding portion that protrudes outwards; wherein the third protruding portion is hollow inside so that a second accommodating compartment is formed; wherein the second accommodating compartment communicates with the accommodating space, and when the vibration motor is mounted on the middle frame, the third protruding portion is accommodated in the second avoiding hole.

13. A vibration motor, used for a terminal device, wherein the terminal device is provided with a middle frame and a limiting structure inside, wherein the limiting structure is fixed to the middle frame, and the limiting structure is provided with a second avoiding hole; and the vibration motor comprises a housing with a first wall plate and a second wall plate that are opposite each other;
- wherein an accommodating space is formed in the housing; wherein the second wall plate is provided with a third protruding portion that protrudes outwards, the third protruding portion is hollow inside so that a second accommodating compartment is formed, the second accommodating compartment communicates with the accommodating space; and
- wherein when the vibration motor is mounted on the middle frame, the first wall plate faces the middle frame, the second wall plate faces the limiting structure, and the third protruding portion is accommodated in the second avoiding hole.

14. A terminal device, comprising:
- a middle frame with a first avoiding hole; and
- a vibration motor;
- wherein the vibration motor comprises a housing with a first wall plate;
- wherein an accommodating space is formed in the housing, the first wall plate is provided with a first protruding portion that protrudes outwards, the first protruding portion is hollow inside to form a first accommodating compartment is formed, and the first accommodating compartment communicates with the accommodating space; and
- wherein when the vibration motor is mounted on the middle frame, an outer surface of the first wall plate faces the middle frame, and the first protruding portion is accommodated in the first avoiding hole.

15. The terminal device of claim 14, wherein the terminal device further comprises a screen; wherein the middle frame comprises a middle plate and a bezel; wherein the bezel encircles an outer edge of the middle plate, the screen is fixed to the bezel, and the vibration motor is fixed to a surface of a side of the middle plate farther away from the screen.

16. The terminal device of claim 15, wherein the surface of the side of the middle plate farther away from the screen is provided with a recess, and at least part of the vibration motor is disposed in the recess.

17. The terminal device of claim 15, wherein a distance between an end face of a first protruding portion farther away from a first wall plate and an outer surface of the first wall plate is a first distance, and a distance between a surface of a side of the middle plate closer to the screen and the outer surface of the first wall plate is a second distance, wherein the first distance is less than or equal to the second distance.

18. The terminal device of claim 15, wherein the vibration motor further comprising: a mass block, wherein the mass block is configured to reciprocatively vibrate relative to the housing in a plane paralleling to a plane in which the first wall plate is located;
- a driving assembly, wherein the driving assembly is configured to drive the mass block to reciprocatively vibrate relative to the housing in the plane paralleling to the plane in which the first wall plate is located; and
- a damping structure, wherein the damping structure is configured to provide damping force for the mass block so that the mass block stops vibrating.

19. The terminal device of claim 18, wherein the driving assembly comprises a magnet assembly and a coil; wherein the magnet assembly is fixed to the mass block, the coil and the magnet assembly cooperate to drive the mass block, and at least part of the coil is located in the first accommodating compartment.

20. The terminal device of claim 19, wherein the vibration motor further comprises an electrical connection structure;
- wherein the electrical connection structure comprises a first segment, a second segment, and a third segment that are sequentially connected; wherein the first segment is fixed to a compartment bottom wall of the first accommodating compartment, and the coil is fixed to the first segment and electrically connected to the first segment; the second segment is fixed to an inner side wall of the first accommodating compartment; and part of the third segment is located outside the housing, wherein the part of the third segment located outside the housing is provided with a positive terminal and a negative terminal.

* * * * *